US006263152B1

(12) United States Patent
Hisatomi et al.

(10) Patent No.: US 6,263,152 B1
(45) Date of Patent: Jul. 17, 2001

(54) RECORDING MEDIA, AND RECORDING/ REPRODUCING APPARATUS

(75) Inventors: Shuichi Hisatomi, Fuchu; Yuji Ito, Tokyo; Shinichi Kikuchi; Kazuhiko Taira, both of Yokohama; Hideo Ando, Hino, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/367,870

(22) PCT Filed: Jan. 21, 1999

(86) PCT No.: PCT/JP99/00220

§ 371 Date: Sep. 3, 1999

§ 102(e) Date: Sep. 3, 1999

(87) PCT Pub. No.: WO99/38168

PCT Pub. Date: Jul. 29, 1999

(30) Foreign Application Priority Data

Jan. 21, 1998 (JP) .................................................. 10-009906

(51) Int. Cl.[7] ........................................................ H04N 5/91

(52) U.S. Cl. .............................. 386/70; 386/111; 386/125

(58) Field of Search .................................... 386/1, 52, 45, 386/46, 68–70, 81–82, 111, 125–126, 95, 112; 369/48; 360/31

(56) References Cited

U.S. PATENT DOCUMENTS

| | | | | |
|---|---|---|---|---|
| 4,685,003 | * | 8/1987 | Westland | 386/52 |
| 5,621,840 | * | 4/1997 | Kawamura et al. | 386/68 |
| 5,905,841 | * | 5/1999 | Peters et al. | 386/52 |
| 6,016,381 | * | 1/2000 | Taira et al. | 386/95 |
| 6,112,010 | * | 8/2000 | Koyama | 386/126 |

FOREIGN PATENT DOCUMENTS

| | | |
|---|---|---|
| 6-89549 | 3/1994 | (JP) . |
| 6-319125 | 11/1994 | (JP) . |

* cited by examiner

*Primary Examiner*—Wendy R. Garber
*Assistant Examiner*—Christopher Onuaku
(74) *Attorney, Agent, or Firm*—Oblon, Spivak, McClelland, Maier & Neustadt, P.C.

(57) ABSTRACT

In order to search for an image recorded on an optical disk 10, a registration trigger is generated automatically or in response to an instruction of the user from a microcomputer block 30, a pointer indicating the recording position of a main image which is used as an index image in a preset area of the optical disk 10 via a data processor 36 and disk drive 32, index image data which becomes the index image is created in an encoder section 50 and data is recorded from an index image buffer memory 59 into a user menu file on the optical disk 10 via a formatter 56, data processor 36 and disk drive 32.

7 Claims, 23 Drawing Sheets

PLY_MAT

| RBP | | CONTENTS | NUMBER OF BYTES |
|---|---|---|---|
| 0 TO 11 | ID | IDENTIFIER | 12 BYTES |
| 12 TO 15 | VOBS_SA | START ADDRESS OF VOBS | 4 BYTES |
| 16 TO 19 | VOBS_EA | END ADDRESS OF VOBS | 4 BYTES |
| 20 TO 23 | CTLI_EA | END ADDRESS OF CTLI | 4 BYTES |
| 24 TO 24 | PLYCI_EA | END ADDRESS OF PLYCI | 4 BYTES |
| 25 TO 28 | CAT | CATEGORY | 4 BYTES |
| 29 TO 30 | V_ATR | VIDEO ATTRIBUTE | 2 BYTES |
| 31 TO 32 | AST_Ns | AUDIO STREAM NUMBER | 2 BYTES |
| 33 TO 34 | AST_ATRT | AUDIO STREAM ATTRIBUTE TABLE | 2 BYTES |
| 35 TO 36 | SPST_Ns | SUB-VIDEO STREAM NUMBER | 2 BYTES |
| 37 TO 38 | SPST_ATRT | SUB-VIDEO ATTRIBUTE TABLE | 2 BYTES |
| 39 TO 39 | USER MENU EXIST FLAG | FLAG INDICATING PRESENCE/ABSENCE OF USER MENU FILE<br>01:PRESENCE OF FILE, 00:NO FILE | 1 BYTE |
| 40 TO 40 | MAIN PCG NUMBER | PGC NUMBER OF TYPICAL REDUCED IMAGE | 2 BYTES |
| 41 TO 44 | RESERVED | RESERVATION | 4 BYTES |
| 45 TO 45 | PLAY_END FLAG | FLAG INDICATING END OF PLAYBACK<br>0:NOT YET PLAYED BACK 1:ALREADY PLAYED BACK | 1 BYTE |

FIG. 7

PGC#1

| NUMBER OF CONSTRUCTION CELLS=3 | |
|---|---|
| #1 | CELL-A |
| #2 | CELL-B |
| #3 | CELL-C |

PGC#2

| NUMBER OF CONSTRUCTION CELLS=3 | |
|---|---|
| #1 | CELL-D |
| #2 | CELL-E |
| #3 | CELL-F |

PGC#3

| NUMBER OF CONSTRUCTION CELLS=5 | |
|---|---|
| #1 | CELL-Q |
| #2 | CELL-R |
| #3 | CELL-S |
| #4 | CELL-T |
| #5 | CELL-U |

PGC_MAI

| RBP | | CONTENTS | NUMBER OF BYTES |
|---|---|---|---|
| 0 TO 3 | PGCI_TABLE_EA | END ADDRESS OF PGCI_TABLE | 4 BYTES |
| 4 TO 7 | PGC_MAI_EA | END ADDRESS OF PGCI_MAI | 4 BYTES |
| 8 TO 11 | PGC_SRP_SA | START ADDRESS OF PGC_SRP | 4 BYTES |
| 12 TO 15 | PGC_SRP_EA | END ADDRESS OF PGC_SRP | 4 BYTES |
| 16 TO 19 | PGCI_SA | START ADDRESS OF PGCI | 4 BYTES |
| 20 TO 23 | PGCI_EA | END ADDRESS OF PGCI | 4 BYTES |
| 24 TO 25 | PGC_Ns | TOTAL NUMBER OF PGCs | 2 BYTES |

FIG. 11

REC_MAT

| RBP | | CONTENTS | NUMBER OF BYTES |
|---|---|---|---|
| 0 TO 3 | RECI_EA | END ADDRESS OF RECI | 4 BYTES |
| 4 TO 7 | REC_MAT_EA | END ADDRESS OF REC_MAT | 4 BYTES |
| 8 TO 11 | FREE_SPACE | SPACE CAPACITY | 4 BYTES |
| 12 TO 12 | ARCHIVE FLAG | FLAG OF PERMANENT STORAGE<br>0:FREE 1:PERMANENT STORAGE | 1 BYTE |

FIG. 14

PGC_GI

| RBP | | CONTENTS | NUMBER OF BYTES |
|---|---|---|---|
| 0 TO 3 | PGC_CNT | PGC CONTENTS | 4 BYTES |
| 4 TO 7 | PGC_PB_TM | PGC PLAYBACK TIME | 4 BYTES |
| 8 TO 23 | PGC_AST_CTLT | PGC AUDIO STREAM CONTROL TABLE | 16 BYTES |
| 24 TO 151 | PGC_SPST_CTLT | PGC SUB-AUDIO STREAM CONTROL TABLE | 128 BYTES |
| 152 TO 159 | PGC_NV_CTL | PGC NAVIGATION CONTROL | 8 BYTES |
| 160 TO 223 | PGC_SP_PLT | SUB-VIDEO PALLET TABLE | 64 BYTES |
| 224 TO 225 | PGC_PGMAP_SA | START ADDRESS OF PROGRAM TABLE | 2 BYTES |
| 226 TO 227 | CELL_PLY_I_SA | START ADDRESS OF CELL_PLY_I | 2 BYTES |
| 228 TO 229 | CELL_Ns | NUMBER OF CELLS USED | 2 BYTES |
| 230 TO 230 | PGC MENU DATA EXIST FLAG | FLAG INDICATING PRESENCE/ABSENCE OF USER MENU DATA 01:PRESENCE OF DATA, 00:NO DATA | 1 BYTE |
| 231 TO 234 | RESERVED | RESERVATION | 4 BYTES |
| 235 TO 235 | PLAY_END FLAG | FLAG INDICATING END OF PLAYBACK 0:NOT YET PLAYED BACK 1:ALREADY PLAYED BACK | 1 BYTE |
| 236 TO 236 | ARCHIVE FLAG | FLAG OF PERMANENT STORAGE 0:FREE 1:PERMANENT STORAGE | 1 BYTE |

FIG. 12

CELL_PLY_I

| RBP | | CONTENTS | NUMBER OF BYTES |
|---|---|---|---|
| 0 TO 3 | C_CAT | CATEGORY OF CELL | 4 BYTES |
| 4 TO 7 | C_PBTM | PLAYBACK TIME OF CELL | 4 BYTES |
| 8 TO 8 | PLAY_END FLAG | FLAG INDICATING END OF PLAYBACK<br>0:NOT YET PLAYED BACK 1:ALREADY PLAYED BACK | 1 BYTE |
| 9 TO 9 | ARCHIVE FLAG | FLAG OF PERMANENT STORAGE<br>0:FREE 1:PERMANENT STORAGE | 1 BYTE |
| 10 TO 12 | CELL_SA(1072) | START ADDRESS OF CELL | 4 BYTES |
| 13 TO 16 | CELL_EA(1073) | END ADDRESS OF CELL | 4 BYTES |
| 17 TO 20 | CELL_PLY_I_EA | END ADDRESS OF CELL_PLY_I | 4 BYTES |
| 21 TO 24 | 1ST_INDEX_PT | INDEX SCENE POINTER ADDRESS -1 | 4 BYTES |
| ⋮ | ⋮ | ⋮ | |
| n TO n+4 | | INDEX SCENE POINTER ADDRESS -M | 4 BYTES |

132 (rows 0 TO 3 through 17 TO 20)

134 (rows 21 TO 24 through n TO n+4)

FIG. 13

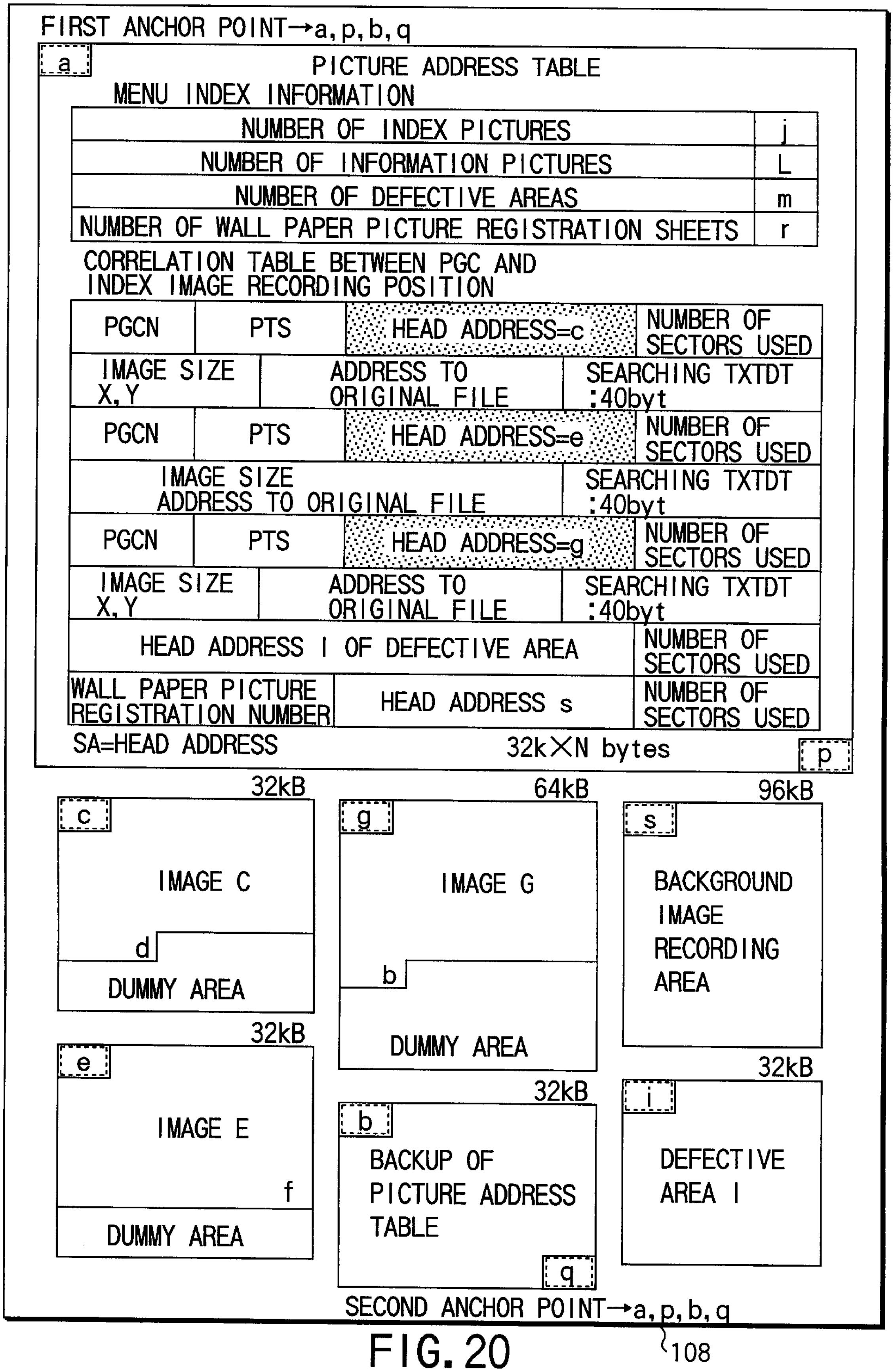

FIG. 20

FIRST ANCHOR POINT → a, p, b, q

PICTURE ADDRESS TABLE

MENU INDEX INFORMATION

| NUMBER OF INDEX PICTURES | j |
|---|---|
| NUMBER OF INFORMATION PICTURES | L |
| NUMBER OF DEFECTIVE AREAS | m |
| NUMBER OF WALL PAPER PICTURE REGISTRATION SHEETS | r |

CORRELATION TABLE BETWEEN PGC AND
INDEX IMAGE RECORDING POSITION

| PGCN | PTS | HEAD ADDRESS=c | NUMBER OF SECTORS USED |
|---|---|---|---|
| IMAGE SIZE X, Y | ADDRESS TO ORIGINAL FILE | | SEARCHING TXTDT :40byt |
| PGCN | PTS | HEAD ADDRESS=e | NUMBER OF SECTORS USED |
| IMAGE SIZE ADDRESS TO ORIGINAL FILE | | | SEARCHING TXTDT :40byt |
| PGCN | PTS | HEAD ADDRESS=g | NUMBER OF SECTORS USED |
| IMAGE SIZE X, Y | ADDRESS TO ORIGINAL FILE | | SEARCHING TXTDT :40byt |
| HEAD ADDRESS I OF DEFECTIVE AREA | | | NUMBER OF SECTORS USED |
| WALL PAPER PICTURE REGISTRATION NUMBER | HEAD ADDRESS s | | NUMBER OF SECTORS USED |

SA=HEAD ADDRESS                    32k×N bytes

32kB — IMAGE C / DUMMY AREA (d)

64kB — IMAGE G / DUMMY AREA (b)

96kB — BACKGROUND IMAGE RECORDING AREA (s)

32kB — IMAGE E / DUMMY AREA (f)

32kB — BACKUP OF PICTURE ADDRESS TABLE (b)

32kB — DEFECTIVE AREA I (i)

SECOND ANCHOR POINT → a, p, b, q

FIG. 20            108

| DESCRIPTOR | CONTENTS | NUMBER OF BYTES |
|---|---|---|
| FIRST ANCHOR POINTER (32 KBYTES) FOR PICTURE ADDRESS TABLE | | |
| | PICTURE ADDRESS TABLE START POSITION (LOGICAL SECTOR NUMBER FROM HEAD POSITION OF MENU FILE) | 2 |
| | PICTURE ADDRESS TABLE END POSITION (LOGICAL SECTOR NUMBER FROM HEAD POSITION OF MENU FILE) | 2 |
| | START POSITION OF BACKUP OF PICTURE ADDRESS TABLE (LOGICAL SECTOR NUMBER FROM HEAD POSITION OF MENU FILE) | 2 |
| | END POSITION OF BACKUP OF PICTURE ADDRESS TABLE (LOGICAL SECTOR NUMBER FROM HEAD POSITION OF MENU FILE) | 2 |
| | PADDING | 32k-8 |
| PICTURE ADDRESS TABLE (32 KBYTES×N) | | |
| MENU INDEX INFORMATION | | |
| | NUMBER OF INDEX PICTURES | 2 |
| | NUMBER OF INFORMATION PICTURES | 2 |
| | NUMBER OF DEFECTIVE AREAS | 2 |
| | NUMBER OF WALL PAPER PICTURES | 1 |
| INDEX PICTURE INFORMATION | | |
| | CONTENTS CHARACTERISTIC=1:INDEX IMAGE INFORMATION ALREADY RECORDED (0:ONLY ADDRESS POINTER) | 1 |
| | | |
| | | |
| | ID OF INDEX PICTURE PGC | 4 |
| | TIME CODE OF INDEX PICTURE (TIME CODE OF INDEX PICTURE SPECIFYING POSITION) | 4 |
| | INDEX PICTURE START POSITION (LOGICAL SECTOR NUMBER FROM HEAD POSITION OF PICTURE OBJECT FILE) | 2 |
| | NUMBER OF SECTORS USED FOR RECORDING INDEX PICTURE | 1 |
| | PICTURE SIZE (IMAGE SIZE:X,Y) | 6 |
| | ADDRESS OF INDEX PICTURE (I PICTURE) | 6 |
| | TEXT DATA (SEARCHING) | 40 |
| INDEX PICTURE INFORMATION (CONTENTS ARE SAME AS ABOVE) (66 BYTES) | | |

FIG. 21

| | |
|---|---|
| INDEX PICTURE INFORMATION (CONTENTS ARE SAME AS ABOVE) (66 BYTES) | |
| INDEX PICTURE INFORMATION (CONTENTS ARE SAME AS ABOVE) (66 BYTES) | |
| INFORMATION PICTURE INFORMATION (IMAGE SPECIFICATION ONLY BY ADDRESS) | |
| CONTENTS CHARACTERISTIC=0:ONLY ADDRESS POINTER | 1 |
| ID OF INFORMATION PICTURE PGC | |
| TIME CODE IN PGC CORRESPONDING TO INFORMATION PICTURE | |
| ADDRESS OF PGC CORRESPONDING TO INFORMATION PICTURE | |
| DEFECTIVE AREA INFORMATION | |
| | |
| WALL PAPER PICTURE INFORMATION | |
| NUMBER OF WALL PAPER PICTURES (REGISTRATION NUMBER OF BACKGROUND IMAGE) | 1 |
| WALL PAPER PICTURE START POSITION (LOGICAL SECTOR NUMBER FROM HEAD POSITION OF MENU FILE OF WALL PAPER RECORDING HEAD POSITION) | 2 |
| NUMBER OF SECTORS USED IN AREA IN WHICH WALL PAPER PICTURE IS RECORDED | 1 |
| PADDING(FOR ATTAINING 32K×N BYTES IN PICTURE ADDRESS TABLE) | |
| SECOND ANCHOR POINTER (10 BYTES) FOR PICTURE ADDRESS TABLE | |
| PICTURE ADDRESS TABLE START POSITION (LOGICAL SECTOR NUMBER FROM HEAD POSITION OF MENU FILE) | 2 |
| PICTURE ADDRESS TABLE END POSITION (LOGICAL SECTOR NUMBER FROM HEAD POSITION OF MENU FILE) | 2 |
| START POSITION OF BACKUP OF PICTURE ADDRESS TABLE (LOGICAL SECTOR NUMBER FROM HEAD POSITION OF MENU FILE) | 2 |
| END POSITION OF BACKUP OF PICTURE ADDRESS TABLE (LOGICAL SECTOR NUMBER FROM HEAD POSITION OF MENU FILE) | 2 |

| TIME MAP TABLE |
|---|
| NUMBER OF FIELD IN VOBU#1 |
| NUMBER OF DATA ITEMS OF VOBU#1 (NUMBER OF SECTOR USED) |
| NUMBER OF FIELD IN VOBU#2 |
| NUMBER OF DATA ITEMS OF VOBU#2 (NUMBER OF SECTOR USED) |
| ⋮ |

RECORDING MEDIA, AND RECORDING/ REPRODUCING APPARATUS

TECHNICAL FIELD

This invention relates to a recording medium, playback apparatus and recording/playback apparatus thereof and more particularly to a recordable/playable recording medium such as a DVD-RAM and a recording/playback apparatus which can be applied to a recording/playback DVD player for recording or playing back an image and voice by use of the recording medium.

BACKGROUND ART

A playback-only optical disk having an image and voice recorded thereon is already put into practice as a music CD, laser disk, video CD or the like. MPEG2 (Moving Picture Experts Group Phase 2) which is the international standard specification for compression of moving pictures and a DVD specification using the AC3 audio compression system are defined and it is put into practice as a DVD video. The DVD specification is initially designed by taking a playback-only disk or a ROM disk which cannot be recorded by the user into consideration, but recently, a DVD-RAM specification which can be played back and recorded by the user was made.

At present, the DVD-RAM specification is realized in a data recording/playback apparatus for a computer, but as a matter of course, application to a DVD recording/playback apparatus for recording/playback a moving picture and voice is studied. When application of the DVD-RAM specification to the DVD recording/playback apparatus is considered, it is desirable to effect the searching operation in the same manner as in the specification for DVD audio and DVD video based on the DVD specification for playback only.

In the DVD video specification, VMG•VTS menus are provided for disk title creating companies. The menus are created by use of an exclusive authoring instrument. Then, the recording content of the disk is displayed in the form of menu in addition to normal video data at the time of playback and buttons are displayed by use of a sub-video image so as to permit the user to select them, thereby making it possible to search for a desired portion.

On the other hand, when a moving picture is recorded by use of the DVD-RAM, the user creates a title, and if VMG•VTS menu data used in the DVD video specification is used, the user also creates them. However, it is extremely difficult for the ordinary user to create the VMG•VTS menu data when considering the large amount of data and devices which must be prepared to create the menu data and it is not practical. Further, in the case of recordable/playable DVD, the operation for re-recording main record data (video, voice data) is frequently effected, but if the VMG•VTS menu data is used, the VMG•VTS menu data must be rewritten each time the main record data is rewritten and the amount of operations for this purpose becomes extremely large.

As described above, when a moving picture and voice are recorded by use of the DVD-RAM, use of VMG•VTS menu data used in the DVD video specification in which the main record data is not assumed to be rewritten imposes an extremely heavy load on the user and it is not practical.

SUMMARY OF THE INVENTION

This invention has been made to solve the above problem and an object of this invention is to provided a recordable/playable recording medium and recording/playback apparatus capable of easily effecting the searching and editing operations without making it necessary to create troublesome menu data.

A recording/playback apparatus according to this invention is a recording/playback apparatus for recording or playing back main record data containing information of at least one of an image and voice and comprises trigger supplying means for supplying a trigger for registering an index image; position information acquiring means for acquiring recording position information on the recording medium of an image which is now being recorded in response to a trigger supplied by the trigger supplying means; and position recording means for recording the recording position information acquired by the position information acquiring means on the recording medium at the time of termination of the image recording. As the recording position information, a sector number and cell number of an image which is now being recorded are contained.

Further, a recording/playback apparatus according to this invention comprises creating means for creating index image data in response to a trigger supplied from the trigger supplying means; and index image recording means for recording the recording position information acquired by the position information acquiring means and the index image data created by the creating means on the recording medium at the time of termination of the image recording.

Further, a recording/playback apparatus according to this invention comprises time information acquiring means for acquiring display time information of an image which is now being recorded in response to a trigger supplied from the trigger supplying means; and time information recording means for recording the display time information acquired by the time information acquiring means on the recording medium at the time of termination of the image recording. The recorded image is processed in the unit of program and the time information is the number of fields counted from the starting time of the program which is now to be defined.

Further, a recordable/playable recording medium according to this invention comprises an area for recording record position information of an image selected in the main record data; and an index image recording area for recording image data of the selected image in the main record data as an index image.

According to this invention, recording position information of an image selected in the main record data is recorded on the recording medium and image data of the image selected in the main record data is alternatively or additionally recorded as an index image. By using information of an image and voice recorded in a recording position indicated by the position information or the index image (compressed or reduced image data) as a menu at the time of playback, the user can immediately detect the recording information on the recording medium.

Therefore, it becomes possible for the user to quickly search for a desired portion based on the menu or efficiently effect the editing operation such as erase or replacement of information of a desired area on the recording medium.

BRIEF DESCRIPTION OF DRAWINGS

FIG. 7 is a diagram showing the contents of a playback management table shown in FIG. 6;

FIG. 11 is a diagram showing the contents of PGC information management information shown in FIG. 8;

FIG. 12 is a diagram showing the contents of PGC general information shown in FIG. 8;

FIG. 13 is a diagram showing the contents of cell playback information shown in FIG. 8;

FIG. 14 is a diagram showing the contents of PGC information management information shown in FIG. 8;

FIG. 20 is a conceptual diagram showing the user menu file format in the above embodiment;

FIG. 21 is a diagram showing the user menu file format more in detail;

FIG. 22 is a diagram showing the user menu file format more in detail;

BEST MODE OF CARRYING OUT THE INVENTION

There will now be described an embodiment of this invention with reference to the accompanying drawings.

As a typical embodiment of a recording/playback apparatus according to this invention, there is provided an apparatus, for example, a DVD digital video recorder for recording/playing back a moving picture encoded based on MPEG2 at a variable bit rate.

Figure 1:
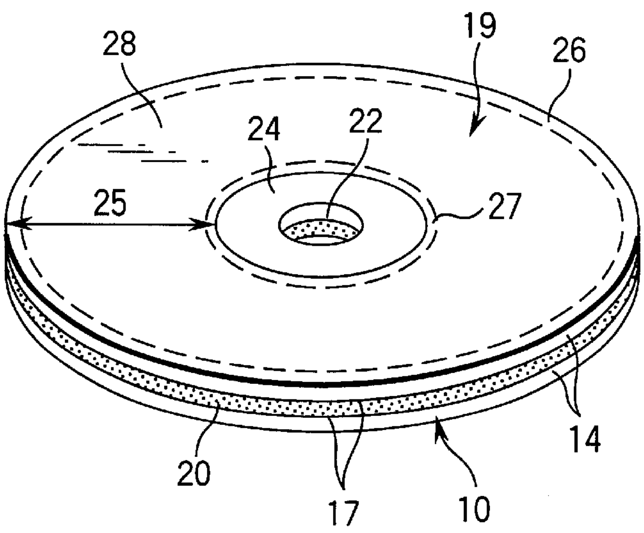
FIG. 1 is a perspective view for illustrating a recordable/playable optical disk (DVD-RAM or DVD-RW disk) according to this invention.

FIG. 1 is a perspective view for illustrating the structure of a recordable optical disk 10 used for the DVD digital video recorder. As shown in FIG. 1, the optical disk 10 has a structure obtained by laminating together one pair of transparent base plates 14 each having a recording layer 17 by use of an adhesive layer 20. Each base plate 14 can be formed of polycarbonate with a thickness of 0.6 mm and the adhesion layer 20 can be formed of extremely thin ultraviolet curing resin (for example, 40 μm thick). By laminating the pair of 0.6 mm base plates together with the recording layers 17 disposed on the respective surfaces of the adhesive layer 20, the optical disk 10 of large capacity with a 1.2 mm thickness can be obtained.

A central hole 22 is formed in the optical disk 10 and a clamp area 24 for clamping the optical disk 10 at the rotational driving time is provided around the central hole 22 on each surface of the disk. The spindle of a disk motor is inserted into the central hole 22 when the optical disk 10 is loaded on a disk drive device (not shown). The optical disk 10 is clamped in the clamp area 24 during the rotation by means of a disk clamper (not shown).

The optical disk 10 has an information area 25 in which video data, audio data and other information can be recorded around the clamp area 24. A lead-out area 26 is provided on the outer peripheral side of the information area 25 and a lead-in area 27 is provided on the inner peripheral side thereof in contact with the clamp area 24. A data recording area 28 is defined between the lead-out area 26 and the lead-in area 27.

A recording track is continuously formed in a spiral form, for example, on the recording layer 17 of the information area 25. The continuous recording track is divided into a plurality of physical sectors and consecutive numbers are attached to the sectors. The sector is used as a recording unit to record various data on the optical disk 10.

The data recording area 28 is an actual data recording area and, for example, video data (main video data) of a movie or the like, sub-video data such as caption, menu or the like, and audio data such as speeches and sound effects are recorded in the form of phase change marks as recording/playback information.

The optical disk 10 is a recording/playback RAM disk and the recording layer 17 is formed of a three-layered structure having a phase change recording material layer formed of a $Ge_2Sb_2Te_5$ layer held between two layers of zinc sulfide/silicon oxide mixture ($ZnS/SiO_2$), for example. A continuous groove is formed in the base plate 14 having the recording/playback recording layer 17 and the phase change recording layer is formed on the groove. Generally, the phase change recording layer on the land portion other than the groove is also used for information recording.

A DVD digital video recorder which will be described later is constructed to effect the repetitive recording operation, repetitive playback operation (read/write operation) for a DVD-RAM disk (or DVD-RW disk) and the repetitive playback operation for a DVD-ROM disk.

Figure 2:
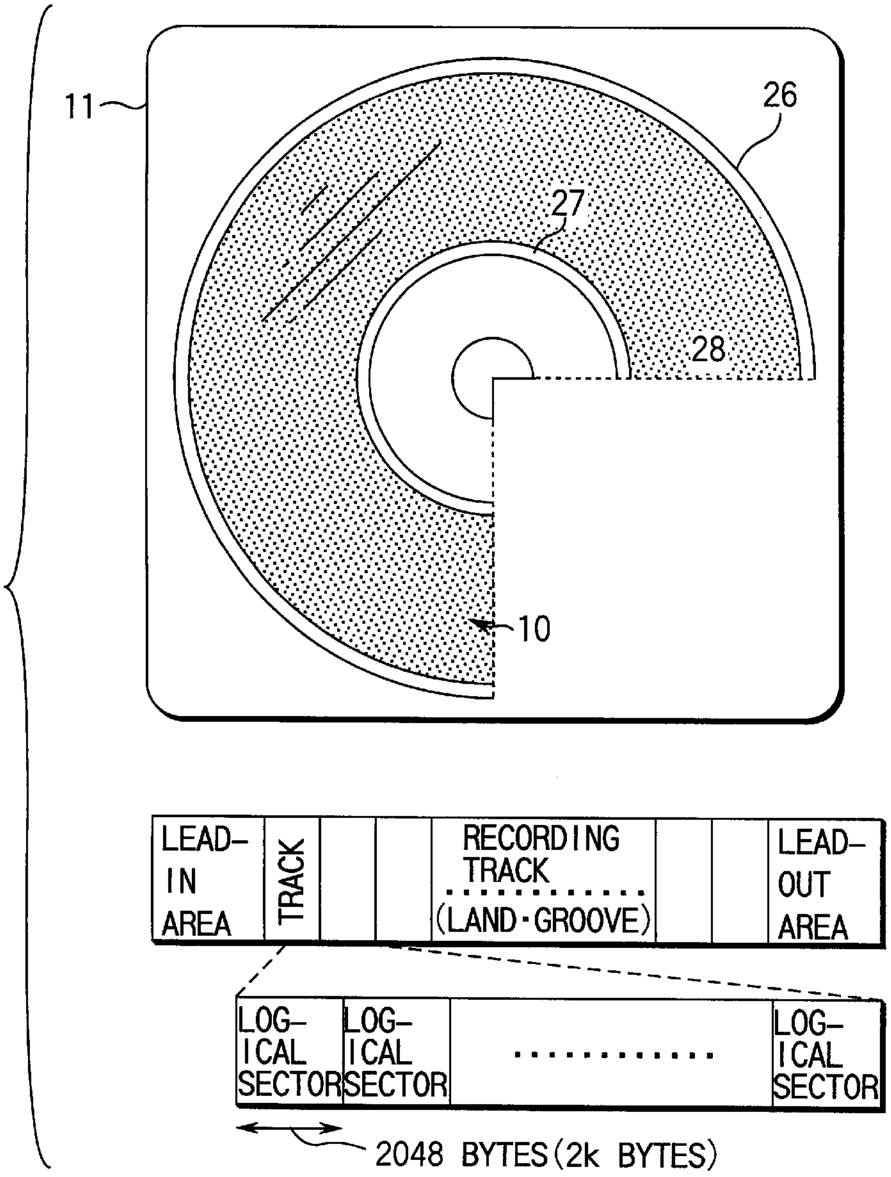
FIG. 2 is a diagram for illustrating the correspondence relation between the data recording area of the optical disk (DVD-RAM) of FIG. 1 and data recording tracks recorded thereon.

FIG. 2 is a diagram for illustrating the correspondence relation between the data recording area 28 of the optical disk (DVD-RAM) 10 of FIG. 1 and the recording track of data recorded thereon. If the disk 10 is a DVD-RAM, the main body of the disk 10 is inserted into a cartridge 11 to protect the delicate disk surface. When the DVD-RAM disk 10 is inserted together with the cartridge 11 into the disk drive of the DVD video recorder which will be described later, the disk 10 is extracted from the cartridge 11, clamped on the turn table of a spindle motor (not shown) and rotated and driven while it is set to face an optical head (not shown).

The data recording track is continuously formed in a spiral form on the recording layer 17 of the information area 25 shown in FIG. 1. As shown in FIG. 2, the continuous track is divided into a plurality of logical sectors (minimum recording unit) of constant recording capacity and data is recorded by using the logical sector as a reference. The recording capacity of one logical sector is set to 2048 bytes (or 2 kbytes) which is the same as one pack data length as will be described later.

The data recording area 28 is an actual data recording area and management data, main video data, sub-video data and voice (audio) data are similarly recorded.

Figure 3:
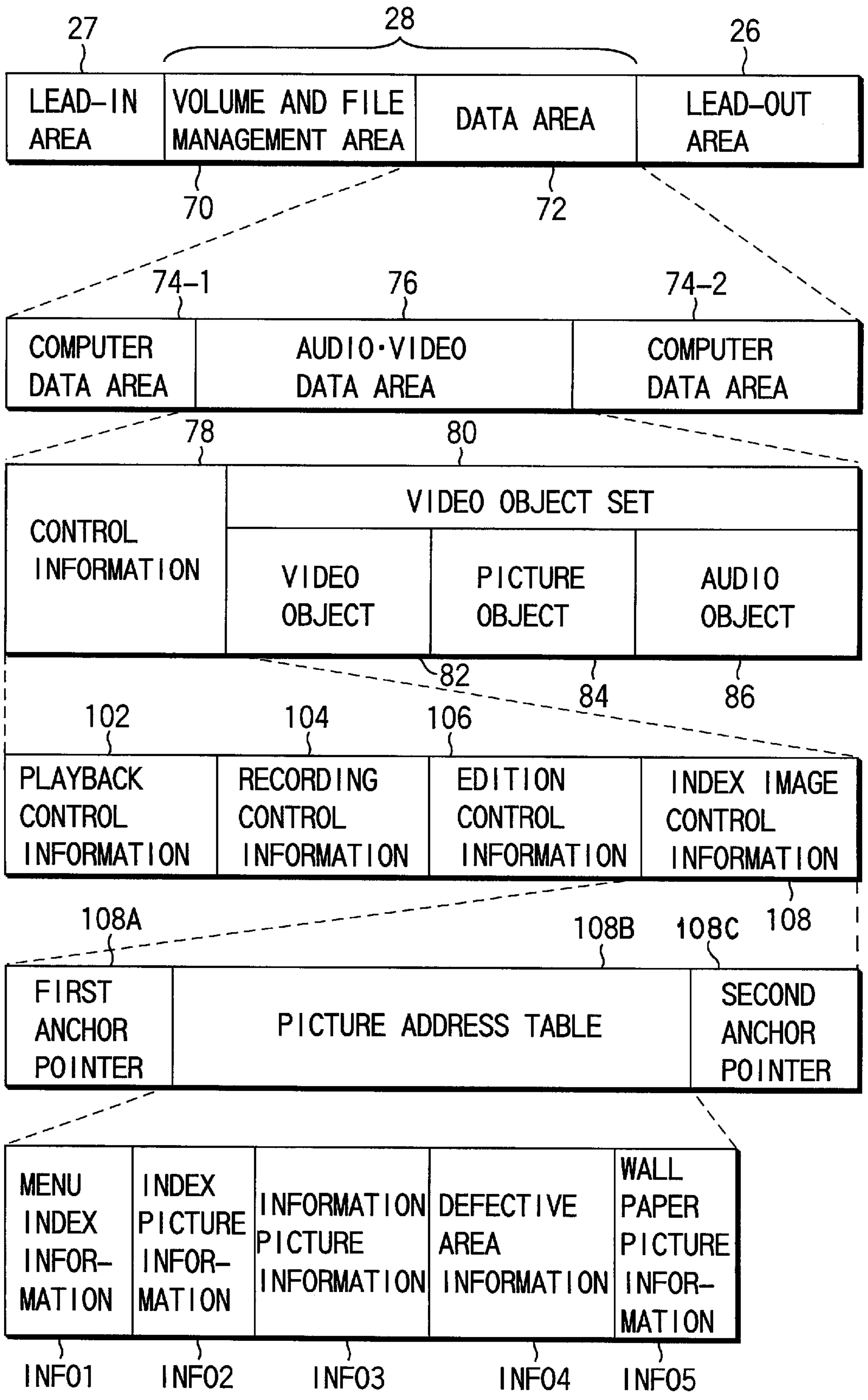
FIG. 3 is a diagram for illustrating the directory structure of information recorded on the optical disk of FIGS. 1 and 2.

FIG. 3 shows the hierarchical structure of data recorded on the optical disk 10 used as an information recording medium on which video information and music information shown in FIGS. 1 and 2 can be recorded and played back. The data recording area 28 formed on the optical disk 10 has a data hierarchical structure as shown in FIG. 3. For example, the logical format of the structure is defined in conformity to the universal disk format (UDF) bridge and ISO9660 which is a standard specification.

As shown in FIG. 3, the lead-in area 27 is formed on the inner peripheral side of the optical disk 10, the lead-out area 26 is formed on the outer peripheral side thereof, the data recording area 28 between the lead-in area 27 and the lead-out area 26 is assigned as a volume space 28, and the volume space 28 includes a space (volume/file management area 70) for information of the volume and file structure and a space (DVD data area 72) for application of the DVD specification.

The lead-in area 27 includes a read-only emboss zone having an optical reflection surface formed in an irregular form, a mirror zone having a flat mirror surface and a rewritable data zone in which information can be rewritten. The lead-out area 26 includes a rewritable data zone in which information can be rewritten.

Information associated with the entire portion of the information recording medium such as a physical sector number indicating the recording start/recording end position, recording density, disk size, disk type of the DVD-ROM (read-only DVD disk), DVD-RAM (DVD disk for recording/playback) and DVD-R (additionally recording type DVD disk) is recorded on the emboss data zone of the leak-in area 27, for example, and information associated with the recording/playback/erase characteristics such as the recording power and recording pulse width required for recording data on the recording layer 17, erase power required for erasing data recorded on the recording layer 17, playback power required for playing back data recorded on the recording layer 17, and linear velocity at the time of recording/erase is also recorded. Further, information associated with the manufacturing of each information recording medium such as a manufacturer's serial number is recorded on the emboss data zone of the leak-in area 27. In the rewritable data zone of the lead-in area 27 and the rewritable data zone of the lead-out area 26, a recording area for recording an inherent disk name of each information recording medium, a trial recording area for determining whether or not the recording and erase operations can be effected in the recording/erase condition, and a management information recording area for determining whether or not a defective area is present in the data area 72 and recording an address of the area are provided and a preparation process for permitting data to be recorded on the data area 72 is effected in the above area and information necessary for data recording/erase/playback after this is recorded in the area.

The volume space 28 is physically divided into a large number of sectors and consecutive numbers are attached to the physical sectors. The logical address of data recorded in the volume space (data recording area) 28 indicates a logical sector number as defined by the ISO9660 and UDF bridge. Like the effective data size of the physical sector, the logical sector size is set to 2048 bytes (2 kbytes) and consecutive numbers are attached according to the ascending order of the physical sector numbers as the logical sector numbers.

The volume space 28 has a hierarchical structure and includes a volume/file management area 70 and a data area 72 formed of at least one video object. The areas 70, 72 are divided on the boundary between the logical sectors. One logical sector is defined to have 2048 bytes and one logical block is also defined to have 2048 bytes. Therefore, one logical sector is defined to be the same as one logical block.

The volume/file management area 70 is a rewritable data zone in which data can be rewritten by the user and corresponds to a management area defined by the ISO9660 and UDF bridge and information associated with the whole volume or a file of audio/video data is stored in a system memory (not shown) in the DVD video recorder as will be described later based on the description of the area 70. Generally, the volume/file management area 70 is constructed by one file.

As shown in FIG. 3, in the data area 72, an area in which computer data and audio/video data can be recorded together is defined. The recording order of the computer data and audio/video data and the recording information size can be arbitrarily set, areas in which the computer data is recorded are referred to as computer data areas 74-1, 74-2, and an area in which audio/video data is recorded is referred to as an audio/video data area 76.

The computer data areas 74-1, 74-2 are not particularly necessarily provided from the viewpoint of its property if only audio/video data is recorded in the recording area 72 and the audio/video data area 76 is not particularly necessarily provided from the viewpoint of its property if only computer data is recorded in the recording area 72. The computer data areas 74-1, 74-2 and the audio/video data area 76 can be formed of one file or a plurality of files.

As shown in FIG. 3, in the audio/video data area 76, control information 78 necessary when the processes such as image recording (sound recording), playback, edition and searching operations are effected and a video object set 80 formed of one or a plurality of objects 82, 84, 86 as the reproduction object or the contents thereof are recorded. In the video object set 80, the video object 82 whose contents are video data, the picture object 84 whose contents are a still picture such as a still/slide picture or picture data such as a searching or editing index image or a location of a desired portion of video data, and the audio object 86 whose contents are audio data are provided. As is clearly understood, the video object set 80 is not required to have all of the objects 82, 84, 86 and may be constructed by at least one of the objects 82, 84, 86. Likewise, the objects 82, 84, 86 are each constructed by one or a plurality of files.

Figure 4:
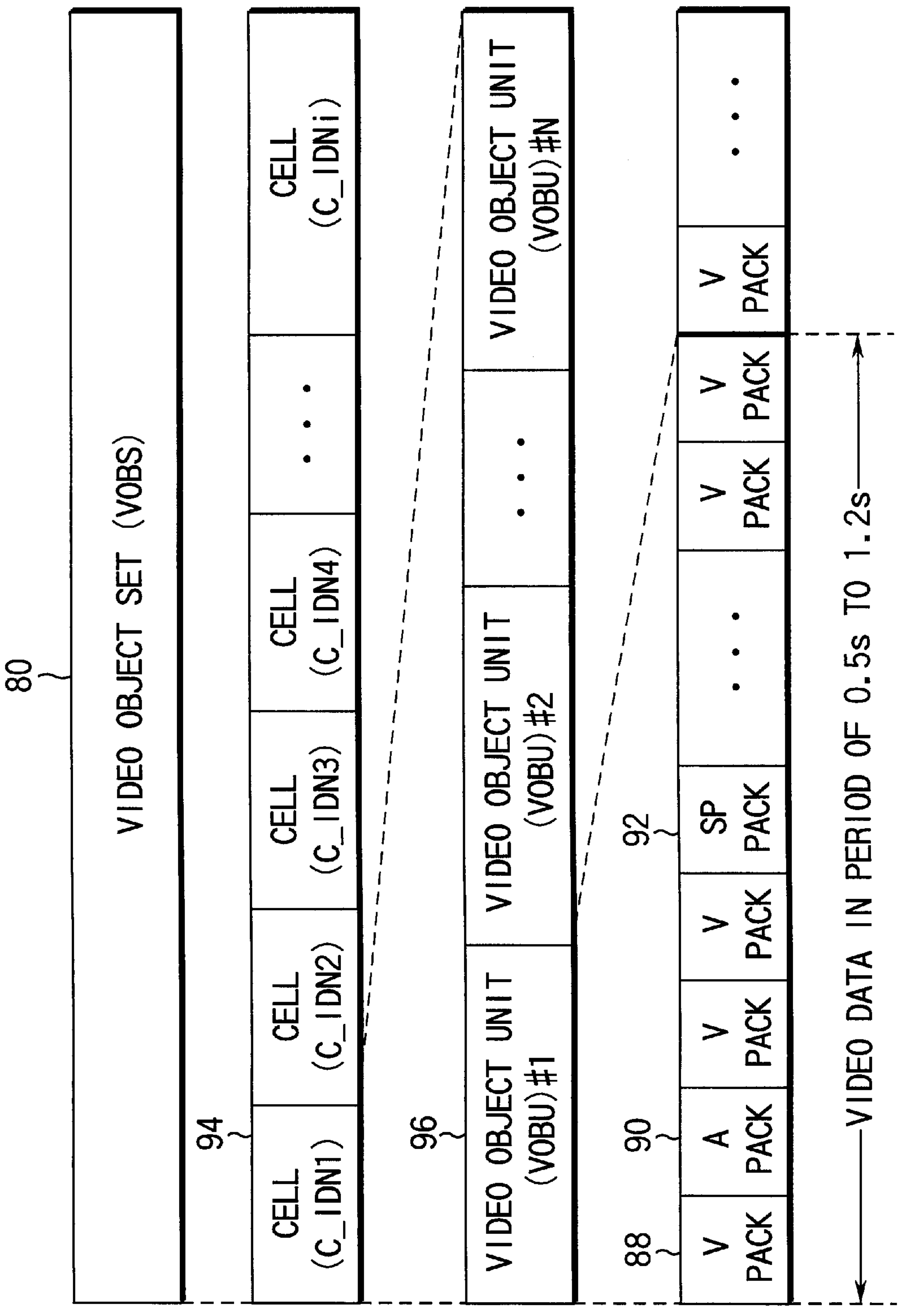
FIG. 4 is a diagram showing the data structure of a video object set shown in FIG. 3.

As shown in FIG. 4, in the video object set 80 constructed by one or a plurality of objects 82, 84, 86, video data (video pack 88 which will be described later) compressed according to the MPEG2 specification, audio data (audio pack 90 which will be described later) compressed according to the preset specification or non-compressed and sub-video data (sub-video pack 92 including bit map data in which one pixel is constructed by a plurality of bits as will be described later) compressed according to the run-length are stored.

If the video object set 80 is constructed only by the video object 82, it has a data structure as shown in FIG. 4, if the video object set 80 is constructed only by the picture object 84, it has a data structure constructed only by the sub-video pack 92 and/or the video pack 88 which does not include the audio pack 90, and if the video object set 80 is constructed only by the video object 86, it has a data structure constructed only by the audio pack 90 which does not include the sub-video pack 92 and video pack 88.

As shown in FIG. 4, logically, the video object set 80, that is, the video, picture and audio objects 82, 84, 86 are constructed by a plurality of cells 94 and each cell 94 is constructed by at least one video object unit (VOBU) 96.

In the cell 94, the video object unit (VOBU) 96 is decoded and played back in the arrangement order in the cell 94 as a rule. The video object unit 96 is a set (pack string) of the video pack (V pack) 88, audio pack (A pack) 90 and sub-video pack (SP pack) 92 and defined as data played back in a preset period, for example, in a period of 0.5 to 1.2 seconds. Each pack is a minimum unit used for effecting the data transfer process and the cell is logically the minimum unit used for effecting the data process.

Identification numbers (IDN#k; k=0 to k) are attached to the video object units (VOBU) 96 and the video object unit 96 can be specified by the identification number. The playback period of the video object unit (VOBU) 96 normally corresponds to a playback period of video data constructed by at least one video group (group of pictures; GOP) contained in the video object unit 96. Generally, the length of one GOP is approx. 0.5 second in terms of the MPEG2 specification and image data compressed to play back the frame images of approx. 15 sheets during the above period is stored.

If the video object unit (VOBU) 96 includes video data, GOPs (in conformity to the MPEG specification) including the video pack 88, sub-video pack 90 and audio pack 92 are arranged to construct a video data stream. If playback data is formed of only the audio and/or sub-video data, the playback data is constructed with the video object unit (VOBU) 96 used as one unit. For example, the audio pack 90 to be played back in a playback period of the video object unit (VOBU) 96 to which target audio data belongs is stored in the video object unit (VOBU) 96.

Identification numbers (IDN#i; i=0 to i) are attached to the video objects 82, 84, 86 constructing the video object set 80 and the video objects 82, 84, 86 can be specified according to the identification number. Further, identification numbers (C_IDN#j) are attached to the cells 94 like the case of the video objects 82, 84, 86.

Figure 5:
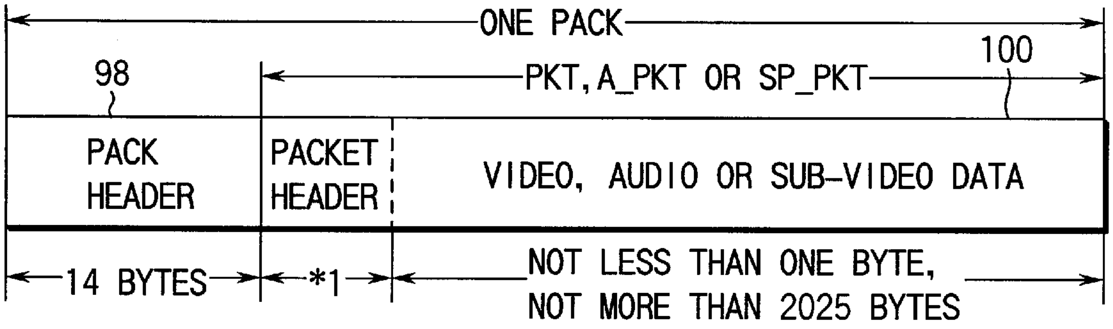
FIG. 5 is a diagram showing the structure of a data pack shown in FIG. 4.

FIG. 5 shows the general structure of the video pack 88, sub-video pack 92 and audio pack 90. Like the logical sector of FIG. 2, the packs are each constructed by data of 2048 byte unit. As shown in FIG. 5, the video, audio and sub-video packs 88, 90, 92 are each constructed by a pack header 98 and a packet 100. The packet 100 includes a packet header in which a decode time stamp (DTS) and presentation time stamp (PTS) are recorded.

The control information 78 shown in FIG. 3 includes playback control information 102 indicating control information necessary at the time of playback, recording control information 104 indicating control information necessary at the time of recording (image recording or sound recording), edition control information 106 indicating control information necessary at the time of edition and index image control information 108 indicating management information associated with a searching or editing index image of a desired position of video data.

Figure 6:
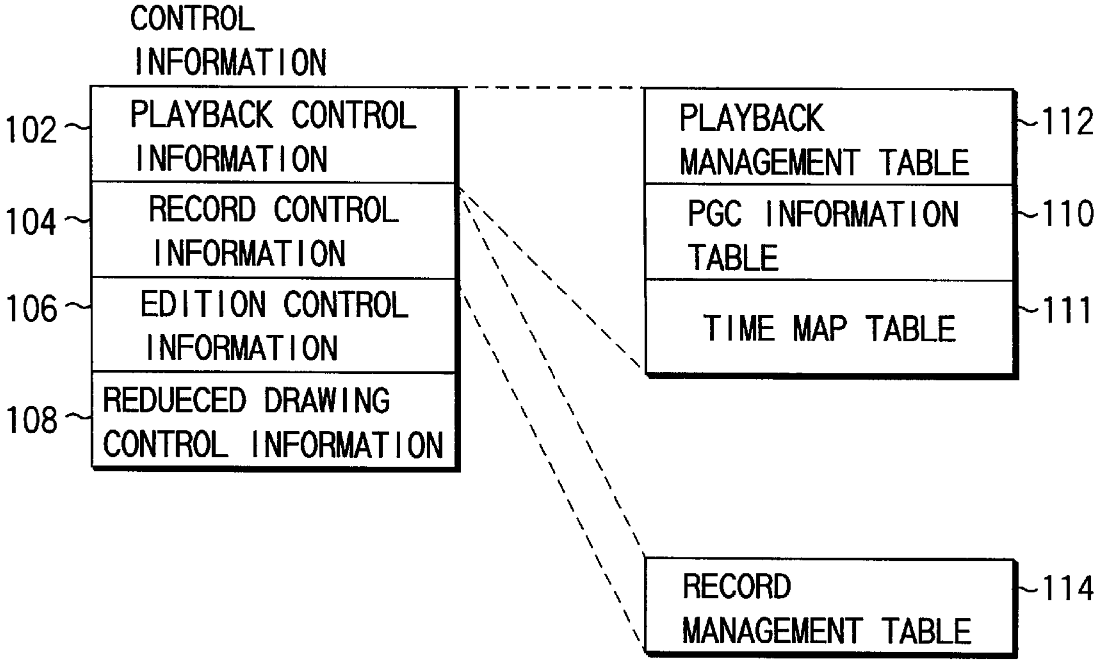
FIG. 6 is a diagram showing the data structure of control information shown in FIG. 4.
Figure 8:
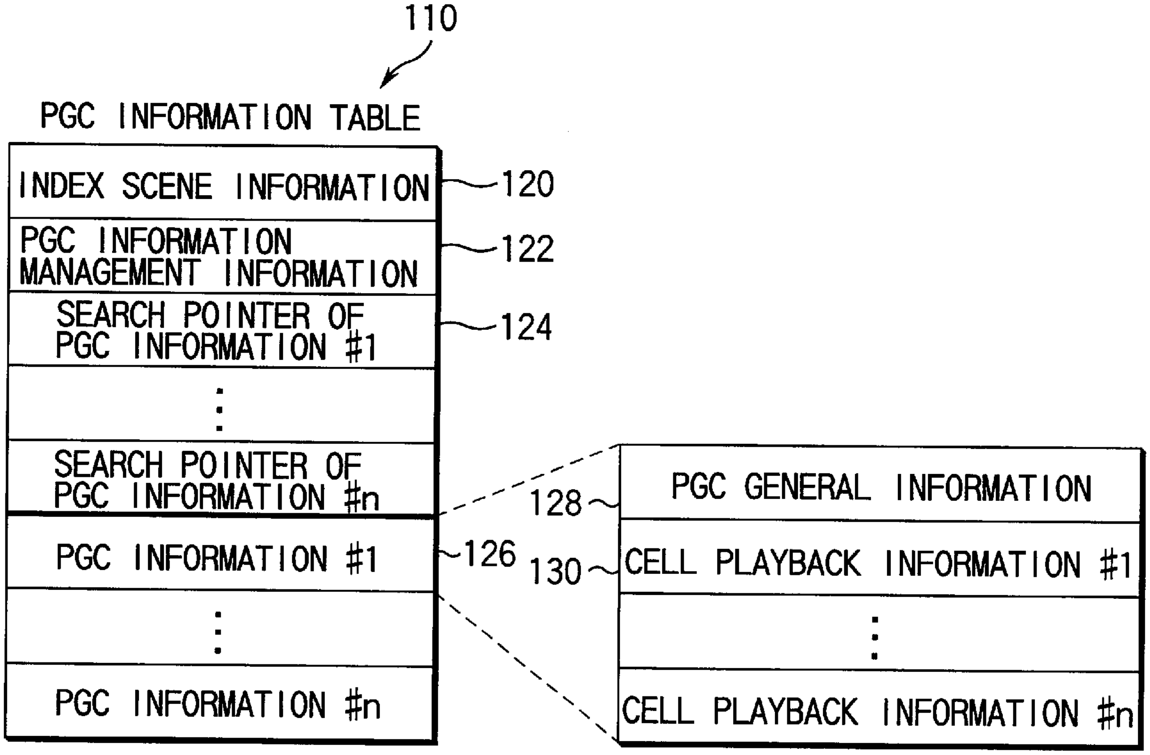
FIG. 8 is a diagram showing the data structure of a PGC information table shown in FIG. 6.

As shown in FIG. 6, the playback control information 102 shown in FIG. 3 includes a management information table (PLY_MAT) 112, program chain (PGC) information table (PGCIT) 110 and time map table 111. Information as shown in FIG. 7 is described in the management information table (PLY_MAT) 112 and the program chain (PGC) information table 110 has a data structure as shown in FIG. 8.

In the program chain (PGC) information table 110, information associated with the playback order of cells and the program chain (PGC) is mainly described and data of the cell 94 recorded in the video object 82 (that is, movie data used as real data constructed by the video object unit 96) is played back according to the description of the program chain (PGC) information table 110. As shown in FIG. 8, the program chain (PGC) information table 110 is constructed by index scene information 120, PGC information management information 122, search pointers #1 to #n 124 for searching each PGC information and PGC information #1 to #n 126. In the index scene information 120, cell numbers of scenes (index scenes) used as index images are described.

If the PGC number is determined, PGC information corresponding to the PGC number is obtained by referring to the search pointer 124. The playback order of cells is derived from the PGC information, data of the cells 94 as real data is acquired from the video object 82 according to the playback order of cells and video data is played back. In this case, the video object 82 is explained, but cell data is derived as real data and played back according to the description of the program chain (PGC) information table 110 in the same manner as in the case of the picture object 84 and audio object 86.

Figures 10A, 10B:
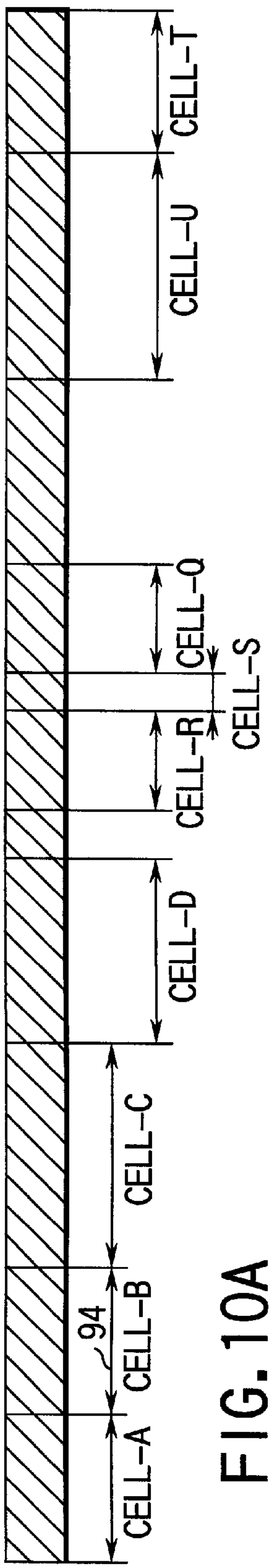
FIGS. 10A and 10B are diagrams for illustrating the concept of PGC shown in FIG. 8.

In this case, the PGC corresponds to the chapter of the movie story and indicates a unit in which a series of playback operations for specifying the playback order of cells is effected. In other words, if one PGC corresponds to one drama, it is possible to consider that a plurality of cells 94 constructing the PGC correspond to various scenes in the drama. The contents of the PGC (or the contents of the cells) may be determined by a software provider making the contents recorded on the disk 10, for example. More specifically, if a video data stream as shown in FIG. 10A is present, the contents thereof are divided into video object units 96 which are played back in a preset period of time and a set of video object units 96 which are continuous in principle are defined in the cell 94.

Figure 9:
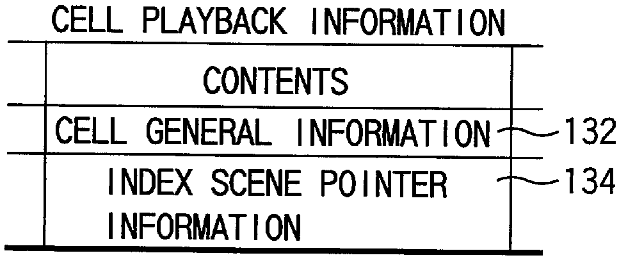
FIG. 9 is a diagram showing the schematic contents of cell playback information shown in FIG. 8.

Since the video object unit 96 is continuous in principle, the cell 94 is defined by the first video object unit 96 and the last video object unit 96 constructing the cell 94 in the PGC information table 110 as will be described later, more specifically, in the cell playback information 130 shown in FIG. 8. That is, information in a playback segment specified by a start address 134 and end address 136 of playback data constructing the cell as shown in FIG. 9 is described in the cell playback information 130.

If the cell 94 is thus defined, the PGC is constructed by determining the playback order of the cell. For example, as shown in FIG. 10B, the PGC #1 is defined by arranging the three cells 94 in the cell playback information table so as to play back the cells in the order of cell-A, cell-B, cell-C. Likewise, the PGC #2 is defined by arranging the three cells 94 in the cell playback information table so as to play back the cells in the order of cell-D, cell-E, cell-F. Further, the PGC #3 is defined by arranging the five cells 94 in the cell playback information table so as to play back the cells in the order of cell-Q, cell-R, cell-S, cell-T, cell-U.

The PGC #2 corresponding to a chapter which continues from the PGC #1 corresponding to a previous chapter is played back by linking the PGC #1 and PGC #2 together. In other words, the cells are successively played back in the order of cell-A to cell-F. In the PGC, the cells 94 are played back in the arrangement order thereof, but the construction of the PGC and the playback order of the PGC are arbitrarily set. Therefore, for example, a PGC can be defined by use of the cells constructing another PGC. Further, since the way of linking or link information can be arbitrarily determined, various stories can be formed or edited. For example, it is possible to link the PGC #3 following the PGC #1 or add the same cell, for example, the cell G, to the PGC #1 and PGC #2 to make different chapters. That is, a desired story can be realized by linking the PGC #3 to the PGC #1 or PGC #2 according to the selection by the user.

In the playback management table 112 shown in FIG. 7, an identifier ID indicating playback control information is described, a start address (VOBS_SA) and end address (VOBS_EA) of the video object set 80 are described and an end address (CTLI_EA) of control information (CTLI) 78 and an end address (PLYI_EA) of playback control information (PLYI) 102 are described. Further, in the playback management table 112, attribute (CAT) indicating that the management information attributes to the format of the recording/playback DVD is described to indicate attribute of video data in the video object set recorded in the audio/video data area 76, for example, the attribute of NTSC system or wide-television system. Further, in the playback management table 112, the number (AST_Ns) of audio streams in the video object set and a table (AST_ATR) in which the attribute thereof, for example, the compression system or the like is described are described and the number (SPST_Ns) of sub-video streams in the video object set and a table (SPST_ATR) in which the attribute thereof is described are described. If the user records searching index image data and menu image data as an independent user menu file in the audio video data area 76, a flag (01) indicating that the user menu is present or a flag (00) indicating no user menu if the menu is not present is described. If the index image is recorded in the audio video data area 76, the number of a PGC which is used as the basis of a typical index image is described. Further, a flag (0: not yet played back, 1: already played back) indicating whether the playback operation by the user for the video object set controlled by the control information 78 is terminated or not is described.

As shown in FIG. 11, in PGC information management information (PGC_MAI) 122 shown in FIG. 8, information indicating the total number of PGCs is contained and information pointing the head portion of each PGC information is contained as described before in the search pointer 124 of PGC information to make it easy to search for the PGC. PGC information 126 is constructed by PGC general information 128 shown in FIG. 8 and at least one cell playback information 130 shown in FIG. 8.

As shown in FIG. 11, in the PGC information management information (PGC_MAI) 122, the end address (PGC_TABLE_EA) of the PGC information table 110, the end address (PGC_MAI_EA) of the PGC information management information (PGC_MAI) 122, the start address (PGC_SRP_SA) and end address (PGC_SRP_EA) of the PGC information search pointer (PGC_SRP) 124, the start address (PGCI_SA) and end address (PGCI_EA) of all of the PGC information items (PGCI) 126 and the number (PGC_NS) of all of the PGCs are described.

As shown in FIG. 12, in the PGC general information (PGC_GI) 128, information indicating the number of cells and the playback time of the PGC is described. That is, in the PGC general information (PGC_GI) 128, the contents (PGC_CNT) of the PGC in which the number of cells and the number of PGCs are described, the playback time (PGC_PB_TM) of the PGC, a table (PGC_AST_CTL) in which information for controlling the audio stream contained in the PGC is described, and a table (PGC_SPST_CTL) in which information for controlling the sub-video stream contained in the PGC is described are described.

Further, in the PGC general information (PGC_GI) 128, PGC navigation control (PGC_NV_CTL) in which link information associated with the PGC to be linked with the PGC, for example, a preceding PGC, next PGC or a skipped (GOup) PGC is described, a sub-video pallet table (PGC_SP_PLT) in which reproduction information associated with color of sub-video pallet is described and the start address (PGC_PGMAP_SA) of a program table (not shown) in which a list of programs constructing the PGC is described are described. Further, in the table (PGC_GI), the start address (CELL_PLY_I_SA) of cell playback information (CELL_PLY_I) 120, a flag (01: menu data is present, 00: menu data is not present) indicating whether menu data associated with the PGC and formed by the user is present or not, reservation, a flag (0: not yet played back, 0: already played back) indicating whether the playback operation for the PGC by the user is completed or not and a flag (ARCHIVE Flag) indicating whether or not it is desired to hold the PGC after this, that is, a flag (0: free [erasable], 1: permanent storage) indicating whether or not it is desired to permanently store the PGC are described.

In the index scene information 120 shown in FIG. 8, the cell number N of a scene registered as an index image in the pointer recording mode which will be described later is described.

As shown in FIG. 9, the cell playback information (CELL_PLY_I) 130 shown in FIG. 8 is roughly divided into cell general information 132 and index scene pointer information 134.

As shown in FIG. 13, in the cell general information 132, the category (C_CAT) of a cell, for example, information indicating whether or not the cell belongs to a block and whether or not the block is an angle block if it belongs to the block is described. In this case, the angle block indicates a block whose angle can be switched. The angle switching indicates that an angle (camera angle) at which an object image is viewed is changed. More specifically, in a musical performance scene (in the same event) of the same music in a rock concert video, for example, it indicates that various scenes such as a scene obtained by viewing the vocalist as a main object, a scene obtained by viewing the guitarist as a main object and a scene obtained by viewing the drummer as a main object can be observed at different angles. As the case wherein the angle switching (or angle changing) is made, a case wherein the angle can be selected according to the preference of the audience or a case wherein the same scene is automatically repeated in the development of the story while changing the angle (a case wherein the software creator/provider makes the story to attain the above effect or a case wherein the user of the DVD video recorder edits the story to attain the above effect) is provided.

Further, as shown in FIG. 13, in the cell general information 132, cell playback time (absolute time) in the PGC is described and a flag (0: not yet played back, 1: already played back) indicating whether or not the playback operation of the cell by the user is terminated and a flag (ARCHIVE Flag) indicating whether or not it is desired to hold the cell after this, that is, a flag (0: free [erasable], 1: permanent storage) indicating whether or not it is desired to permanently store the cell are described.

Further, as shown in FIG. 13, in the cell general information 132, a cell start address (CELL_SA) and end address (CELL_EA) are described. The cell start address and end address are described by use of relative addresses of the first and last video object units (VOBU) of the cell from the head of the video object set 80. Further, in the cell general information 132, the end address (CELL_PLY_I_EA) of the cell playback information (CELL_PLY_I) 130 is also described. The end address of the cell playback information is provided since the length of the index scene pointer information 134 is not constant although the length of the cell general information is constant.

As shown in FIG. 13, in the index scene pointer information 134, a physical sector number (which is referred to as an index scene pointer address (INDEX_PT)) of PGC information containing the cell number of an index scene (which is a scene used as an index image) recorded in the index scene information 120 is described. In FIG. 13, M index scene pointer addresses are provided and M is a variable number.

Therefore, at the time of searching for an image recorded on the optical disk 10, an index image can be searched for by reading the cell number of a cell containing the index scene from the index scene information 120 in the PGC information table 110 shown in FIG. 8 and searching the PGC information 126 containing the cell number to read the index scene pointer information 134 on the cell playback information 130 in the PGC general information 128 of the PGC information 126.

The procedure for registering the cell number into the index scene information 120 and registering the index scene pointer information 134 is described later in detail.

The recording control information 104 shown in FIGS. 3 and 6 contains a recording management table 114 shown in FIG. 14 and the end address (RECI_EA) of the recording control information 104 and the end address (REC_MAT_EA) of the recording management table 114 are described in the recording management table 114 and a free area (FREE_SPACE) for writing information associated with the recording management is provided. Further, in the recording management table 114, a flag (ARCHIVE Flag) indicating whether or not it is desired to hold the VOBU or a flag (0: free [erasable], 1 permanent storage) indicating whether or not it is desired to permanently hold the VOBU is described.

The reduced drawing control information 108 shown in FIG. 3 includes a first anchor pointer 108-A, picture address table 108-B and a second anchor pointer 108-C, and the picture address table 108-B includes menu index information INFO1, index picture information INFO2, information picture information INFO3, defective area information INFO4 and wall paper picture information INFO5.

Figure 15:
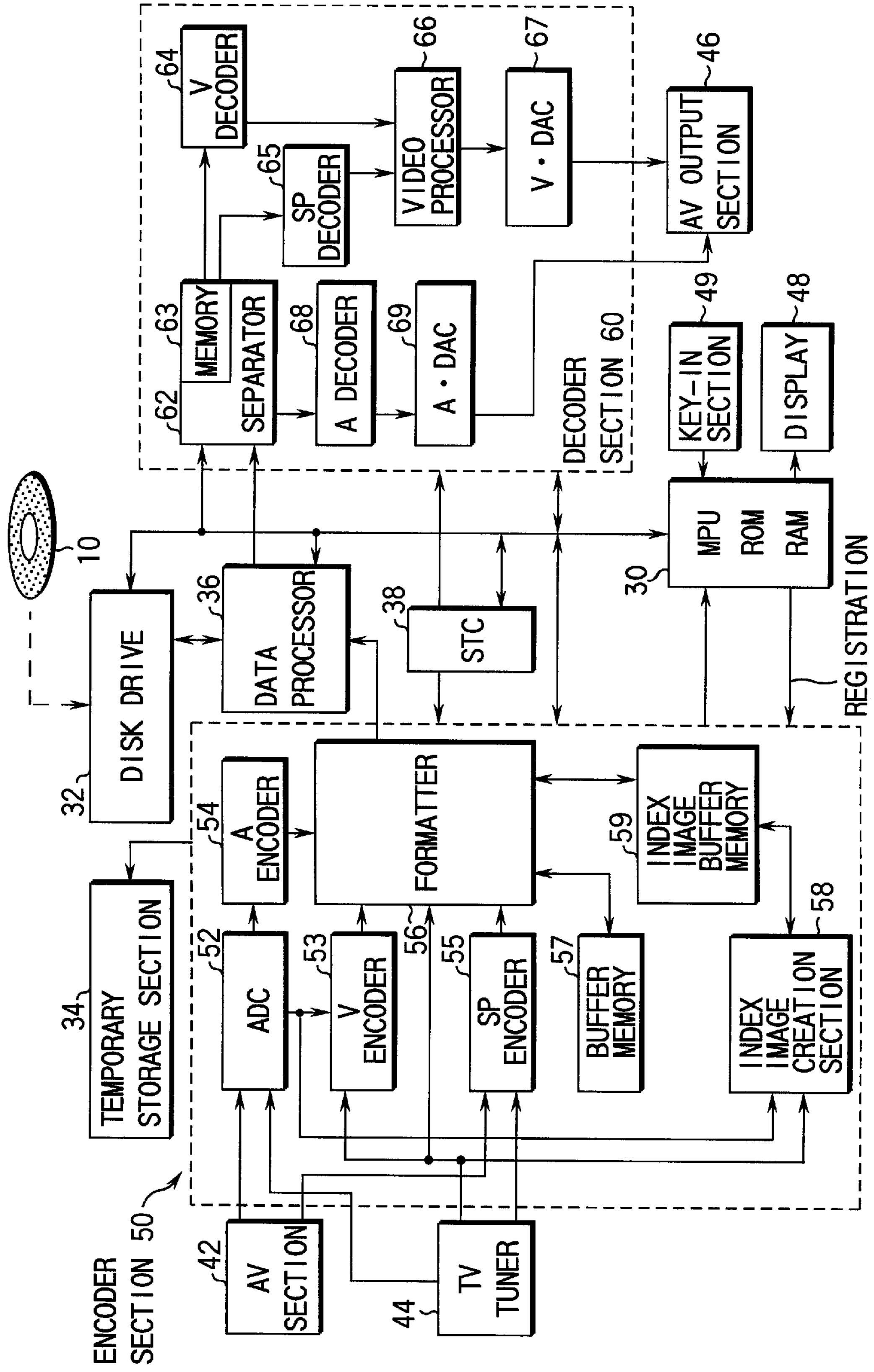
FIG. 15 is a block diagram for illustrating the construction of a DVD video recorder used as a recording/playback apparatus according to one embodiment of this invention.

FIG. 15 shows the construction of a device (DVD video recorder) used for recording/playing back digital moving image information at a variable recording rate with respect to the disk of FIG. 1 by use of information with the construction explained with reference to FIGS. 3 to 14.

The device main body of the DVD video recorder rotates and drives the optical disk 10 which is a DVD-RAM or DVD-R disk, for example, and is constructed by a disk drive section (disk drive 32, temporary storage section 34, data processor 36, system time counter 38 and the like) for reading/writing information with respect to the optical disk 10, an encoder section 50 constructing the recording section, a decoder section 60 constructing the playback section, and a microcomputer block 30 for controlling the operation of the device main body.

The encoder section 50 includes an ADC (analog-digital converter) 52, video encoder (V encoder) 53, audio encoder (A encoder) 54, sub-video encoder (SP encoder) 55, formatter 56, buffer 57, index image creating section 58 and index image buffer memory 59.

The ADC 52 is supplied with an external analog video signal and external analog audio signal from the AV input section 42, or an analog TV signal and analog voice signal from the TV tuner 44. The ADC 52 converts an input analog video signal into a digital form with a sampling frequency 13.5 MHz and quantization bit number of 8 bits, for example. That is, a luminance component Y, color difference component Cr (or Y-R) and color difference component Cb (or Y-B) are quantized by use of 8 bits. Further, the ADC 52 converts an input analog audio signal into a digital form with a sampling frequency 48 kHz and quantization bit number of 16 bits, for example.

When an analog video signal and digital audio signal are input to the ADC 52, the ADC 52 passes the digital audio signal therethrough as it is. At this time, a process for reducing the jitter attached to the digital signal or a process for changing the sampling rate or quantization bit number may be effected without changing the contents of the digital audio signal. Further, when a digital video signal and digital audio signal are input to the ADC 52, the ADC 52 passes the digital video signal and digital audio signal therethrough as they are. The jitter reducing process or sampling rate changing process may be effected without changing the contents of the digital signals.

The digital video signal component from the ADC 52 is supplied to the formatter 56 via the video encoder (V encoder) 53. The digital audio signal component from the ADC 52 is supplied to the formatter 56 via the audio encoder (A encoder) 54.

The V encoder 53 has a function of converting the input digital video signal into a compressed digital signal at a variable bit rate based on the MPEG2 or MPEG1 specification.

The A encoder 54 has a function of converting the input digital audio signal into a digital signal (or digital signal of linear PCM) compressed at a fixed bit rate based on the MPEG audio or AC-3 specification.

When a DVD video signal with data construction shown in FIGS. 4 and 5 or a signal from the DVD video player with independent output terminal for the sub-video signal is input from the AV input section 42 or when the DVD video signal with the above data construction is broadcasted and received by the TV tuner 44, the sub-video signal component (sub-video pack) in the DVD video signal is input to the sub-video encoder (SP encoder) 55. The sub-video data input to the SP encoder 55 is converted into a preset signal configuration and then supplied to the formatter 56.

The formatter 56 performs the preset signal processing for the input video signal, audio signal, sub-video signal and the like while using the buffer memory 57 as a work area and outputs record data which coincides with the above format (file structure) to the data processor 36.

Now, the standard encode processing contents for creating the above record data is simply explained. If the encode process is started in the encoder section 50 of FIG. 15, parameters necessary for encoding video (main video) data and audio data are set. Next, the main video data is pre-encoded by use of the set parameters and a distribution code amount suitable for the set average transfer rate (recording rate) is derived. The main video data is encoded based on the distribution code amount obtained by the pre-encoding operation. At this time, the encoding operation for the audio data is simultaneously effected.

In a case where the data compression amount is insufficient, for example, in a case where a desired program cannot be stored into the DVD-RAM disk or DVD-R disk to be used for recording as the result of pre-encoding, the partial encoding operation for the main video data is effected again and the main video data which is encoded again is substituted for a main video data portion previously pre-encoded if a chance for pre-encoding the main video data again can be obtained, that is, if the recording source is a repetitive playable source such as a video tape or video disk, for example. The main video data and audio data are encoded by a sequence of processes and the value of an average bit rate necessary for recording is significantly reduced. Likewise, a parameter necessary for encoding the sub-video data is set and the encoded sub-video data is formed.

The main video data, audio data and sub-video data thus encoded are combined and converted into a structure of video object.

That is, a cell used as a minimum unit of the main video data (video data) is set and playback information (C_PLY_I) as shown in FIG. 13 is created. Next, the construction of the cell constructing the program chain (PGC) and the main video, sub-video and audio attributes are set (as part of the attributes, information obtained when corresponding data is encoded is used) and the playback control information 102 including various information items explained with reference to FIGS. 3 and 6 is created.

The encoded main video data, audio data and sub-video data are finely divided into packs with a preset size (2048 bits) as shown in FIG. 5. In the packs, time stamps such as a PTS (presentation time stamp) and DTS (decode time stamp) are adequately described. As the PTS of the sub-video, time delayed by a given amount with respect to the PTS of the main video data or audio data of the same playback time range can be described.

The packs are set into the VOBU 96 as data played back in a preset period of time so as to be played back in the time stamp order of the packs and each data cell is defined while arranging the VOBUs 96 and a VOB 82 constructed by a plurality of cells is formed. The VOBS 80 obtained by combining at least one VOB is formatted into a structure shown in FIG. 4.

The disk drive section for effecting the information reading/writing (image recording and/or playback) with respect to the DVD disk 10 includes a disk changer section (not shown), disk drive 32, temporary storage section 34, data processor 36, and system time counter (or system time clock; STC) 38.

The temporary storage section 34 buffers a preset amount of data among data (data output from the encoder section 50) written into the disk 10 via the disk drive 32 or buffers a preset amount of data among data (data input to the decoder section 60) played back from the disk 10 via the disk drive 32.

For example, if the temporary storage section 34 is constructed by a 4-Mbyte semiconductor memory (DRAM), the buffering of playback data or record data of approx. 8 seconds at the average recording rate of 4 Mbps can be attained. Further, if the temporary storage section 34 is constructed by a 16-Mbyte EEPROM (flash memory), the buffering of playback data or record data of approx. 30 seconds at the average recording rate of 4 Mbps can be attained. Also, if the temporary storage section 34 is constructed by a 100-Mbyte micro HDD (hard disk), the buffering of playback data or record data of more than 3 minutes at the average recording rate of 4 Mbps can be attained.

The temporary storage section 34 can be used to temporarily store recording information until the disk 10 is replaced by a new disk when the disk 10 is used up in the course of recording. Further, when a high-speed drive (higher than twice the original speed) is used as the disk drive 32, the temporary storage section 34 can be used to temporarily store data which is excessively read out in comparison with the case of normal drive in a preset period of time. If readout data at the time of playback is buffered in the temporary storage section 34, a playback image can be prevented from being interrupted by substituting playback data buffered in the temporary storage section 34 even when an optical pickup (not shown) causes a readout error due to vibration shock or the like.

The data processor 36 of FIG. 15 supplies DVD record data from the encoder section 50 to the disk drive 32, extracts a DVD playback signal played back from the disk 10 from the drive 32, rewrites management information recorded on the disk 10, or deletes data (file or VTS) recorded on the disk 10 according to the control of the microcomputer block 30.

The microcomputer block 30 includes an MPU (or CPU), a ROM in which control programs are stored and a RAM which provides a work area necessary for execution of the program.

The contents to be notified to the user of the DVD video recorder among the results of execution by the MPU 30 are displayed on the display section 48 of the DVD video recorder or displayed on a monitor display in an on-screen display (OSD) manner.

The timings at which the MPU 30 controls the disk changer section, disk drive 32, data processor 36, encoder section 50 and/or decoder section 60 can be set based on time data from the STC 38. The recording/playback operation is normally effected in synchronism with the time clock from the STC 38 and the other process may be effected at a timing independent from the STC 38.

The data section 60 includes a separator 62 for separating and extracting each pack from the DVD playback data having the pack construction as shown in FIG. 5, a memory 63 used at the time of pack separation or execution of the other signal processing, a video decoder (V decoder) 64 for decoding main video data separated by the separator 62, a sub-video decoder (SP decoder) 65 for decoding sub-video data (sub-video pack 90) separated by the separator 62, an audio decoder (A decoder) 68 for decoding audio data (audio pack 91 of FIG. 9) separated by the separator 62, a video processor 66 for adequately combining the sub-video data from the SP decoder 65 with the video data from the V decoder 64, superposing the menu, highlight button, caption and other sub-video image on the main video image and outputting the result of superposition, a video digital/analog converter (V•DAC) 67 for converting a digital video output from the video processor 66 to an analog video signal, and an audio digital/analog converter (A•DAC) 67 for converting a digital audio output from the audio processor 68 to an analog audio signal.

The analog video signal from the V•DAC 67 and the analog audio signal from the A•DAC 67 are supplied to external components (not shown) (2-channel to 6-channel multi-channel stereo device+monitor TV or projector) via an AV output section 46.

Next, the basic data processing operations, that is, the recording process and playback process of the DVD video recorder according to this embodiment are explained.

At the time of data processing for recording, if the user first effects the key-in operation and the MPU of the microcomputer block 30 receives a recording instruction, necessary management data is read out from the DVD disk 10 via the disk drive 32 to determine an area in which video data is recorded. Then, the thus determined area is set in the management area and the recording start address of video data is set on the disk drive 32.

In this case, the management area specifies the file management section 70 (specifies the directory decode in ISO9660) for managing the files and control information 78 and parameters necessary for the file management section are sequentially recorded.

Next, the microcomputer block 30 resets time of the STC section 38. In this example, the STC 38 is a timer of the system and the recording/playback operation is effected with the time thereof used as a reference. After this, the microcomputer block 30 sets the contents of other sections.

The flow of a video signal is as follows. That is, an AV signal input from the TV tuner section 44 or external input section is A/D converted by the ADC 52 and the video signal and audio signal are respectively supplied to the video encoder 53 and audio encoder 54, and the closed caption signal from the TV tuner 44 or the text signal of text broadcasting is supplied to the SP encoder 55.

The encoders 53, 54, 55 compress the respective input signals to make packets (in this case, each packet is made such that each pack has 2048 bytes when each packet is formed into packs) and the packets are input to the formatter section 56. In this case, the encoders 53, 54, 55 determine and record PTS, DTS of each packet according to the value of the STC 38 as required.

The formatter 56 temporarily holds packet data to the buffer memory 57, and then sets each input packet data into packs, mixes the packs for each GOP and supplies the result of mixing to the data processor 36.

The data processor 36 deals with every 16 packs as an ECC (error correction code) block and supplies the same to the disk drive 32 after attaching the ECC thereto. However, if the disk drive 32 does not make ready for recording on the disk 10, data is transferred to the temporary storage section 34, the standby state is kept until the preparation for recording data is set up, and data recording is started when the preparation is set up. In this case, it is assumed that the temporary storage section 34 is formed of a large-capacity memory since it holds record data of several minutes or more by high-speed access.

At the time of termination of the recording operation, information necessary for the volume & file management area 70 and the playback control information 102 of the control information are recorded and the recording operation is terminated. In this case, the microcomputer block 30 can effect the read/write operation with respect to the data processor 36 via a microcomputer bus to read/write the volume & file management area 70 of the file.

In the data processing at the time of playback operation, the user first effects the key-in operation and the microcomputer block 30 receives a playback instruction and the volume & file management area 70 is read out via the data processor 36 by use of the disk drive 32 to determine the address to be played back. In this case, the volume & file management area 70 indicates the volume descriptor and file management section. That is, whether the optical disk 10 is a DVD disk or not is determined by use of the volume descriptor and the control information 78 is read out by use of address information of the file management section to determine the playback start address in the video object 82, 84 or 86 corresponding to the title played back by the control information 78.

Next, the microcomputer block 30 supplies a read instruction and address of previously determined data to be played back to the disk drive 32. The disk drive 32 reads out sector data from the disk 10 according to the supplied instruction, corrects the error in the data processor 36, and outputs the data in a pack data form to the decoder section 60.

In the decoder section 60, the separator 62 receives the readout pack data, forms the data into a packet form, transfers the video packet data (MPEG video data) to the video decoder 64, transfers the audio packet data to the audio decoder 68, and transfers the sub-video packet data to the SP decoder 65.

After this, the decoders 64, 65, 68 effect the playback processes in synchronism with the values of the PTS (presentation time stamp) of the respective packet data items (output packet data decoded at the timing at which the values of the PTS and STC 38 coincide with each other) and can supply a moving picture with voice caption to the TV.

Next, the feature of this invention of the registration procedure of index scene to the optical disk 10 is explained by taking a case wherein an index image is most frequently used as the index scene as an example.

The index image is an image used for searching or editing the recording contents of the optical disk 10. As the method for registering the index image in this embodiment, two methods are provided which include a method (which is called a pointer recording mode) for recording position information (pointer) indicating the recording position of the index image in the main record data (video data) on the optical disk 10 and a method (which is called an index image recording mode) for recording index image data created from the input video data by the index image creating section 58 on the optical disk 10.

According to the pointer recording mode, the index image can be expressed by use of a pointer to the main image without particularly and actually creating an index image. Therefore, since the index image is not actually provided, an advantage that the disk capacity used is reduced accordingly can be attained. However, since the index image is displayed while it is created on the decoder side at the time of menu display, the disk searching operation is frequently effected and it takes a bit long time to display the user menu in comparison with the index image recording mode.

For registration of the index image, the above two modes may be selectively used by the specification of the user or both of the recording modes may be combined. in this embodiment, a case wherein both recording modes are combined is explained.

Figure 16:
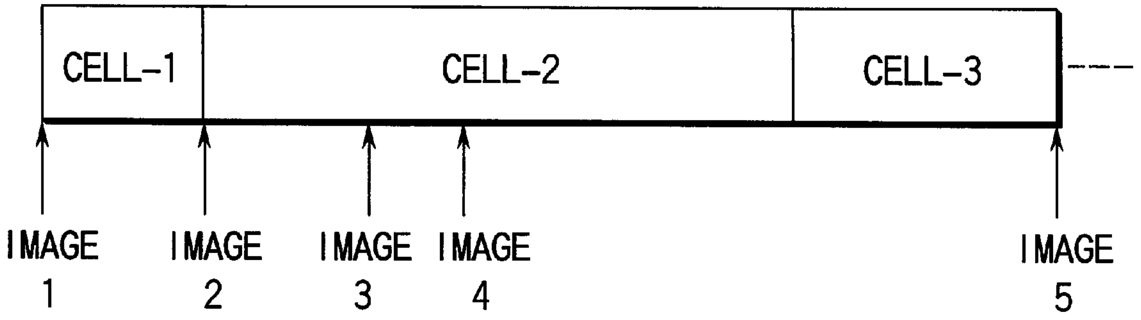
FIG. 16 is a diagram showing one example of the registration timing of an index image.

For registration of the index image, the device automatically detects the recording start/termination, for example, as shown in FIG. 16, images 1, 2 of a cell-1 can be registered at the recording start time of the cell-1 or an image 5 of the last frame of a cell-3 can be registered at the recording termination time. Further, the user can register the image by manually effecting the key-in operation or the like while the user monitors the image which is now being recorded on the display screen. In this case, as shown by images 3, 4 in FIG. 16, a plurality of desired images in the cell-2 generated during the recording operation can be registered.

Figure 17:
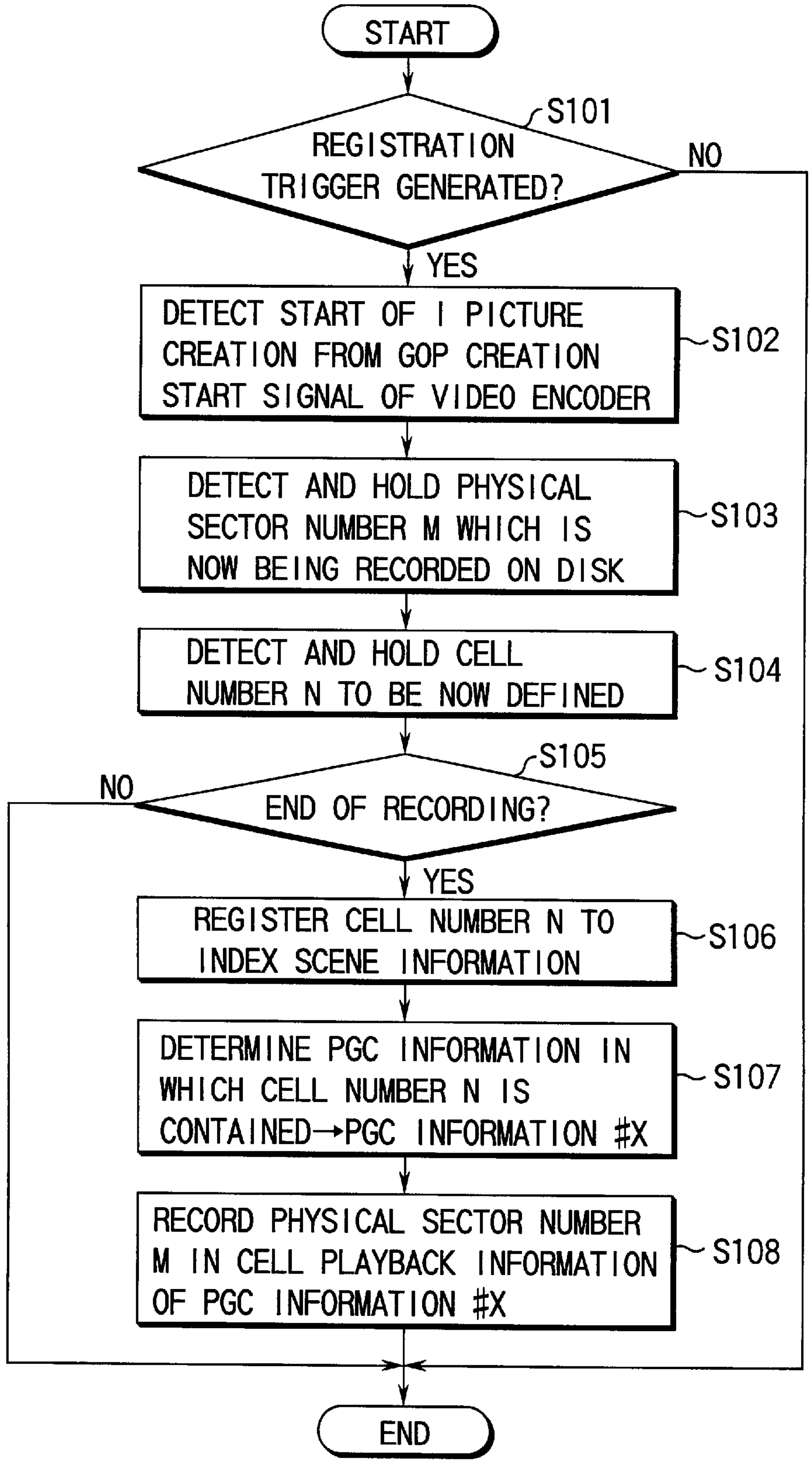
FIG. 17 is a flowchart showing the index image registering procedure in the pointer recording mode in the above embodiment.

First, the index image registration procedure in the pointer recording mode is explained by use of the flowchart shown in FIG. 17.

If the user issues a registration instruction of the index image via a key-in section 49, the MPU in the microcomputer block 30 determines that the registration trigger is present as shown in the step S101, issues a registration trigger to the encoder section 50, receives a GOP creation start signal from the video encoder 53, and detects the start of the I picture creation operation which will be described later (step S102). The I picture is used as an index image and the I picture recording position becomes a registration point.

The registration trigger from the MPU may be generated, for example, once each time the user inputs a registration instruction or the MPU may automatically generate the registration trigger at the time of recording start/termination with respect to the optical disk 10 or at the time of change of scenes of video or audio. It is preferable that the user can specify the above selection via the key-in section 49.

Next, the MPU in the microcomputer block 30 detects the physical sector number M (head sector address of the I picture) which is now being recorded on the optical disk 10 via the disk drive 32 and data processor 36 and stores the same in the RAM (step S103), further detects the cell number N of a cell which is to be defined (that is, which includes the I picture as the index image) and stores the same in the RAM (step S104).

Then, the MPU in the microcomputer block 30 determines whether the recording operation is terminated or not according to the instruction from the key-in section 49 or via the disk drive 32 and data processor 36 (step S105). If the recording operation is not terminated, the process is returned and the step S101 is effected again after the elapse of preset time. If it is detected in the step S105 that the recording operation is terminated, the cell number N stored in the step S104 is registered in the index scene information 120 of the PGC information table 110 shown in FIG. 8 on the optical disk 10 (step S106).

Next, the MPU in the microcomputer block 30 searches the PGC information table 110 shown in FIG. 8 and determines the number (PGC information #X) of PGC information containing the cell number N described in the index scene information 120 (step S107).

Then, the MPU in the microcomputer block 30 records the physical sector number M stored in the RAM in the step S103 on the optical disk 10 (step S108). For example, if the PGC information searched for in the step S107 is #1, the physical sector number M is recorded in the column of the index scene pointer address of the index scene pointer information 134 (FIG. 13) of the cell playback information 130 in which the PGC information is #I.

Basically, video data which is now being recorded on the optical disk 10 is continuous on the time base if the recording thereof is not interrupted and the continuous portion can be grouped into the same type from the viewpoint of the contents thereof. The grouping is effected in the unit of cells as described before. If the actual recording operation is considered, one cell is generated by the recording start and recording termination operations. Therefore, as the position information of the index image, one physical sector number M of the typical I picture of a desired cell may be registered.

Figure 18:
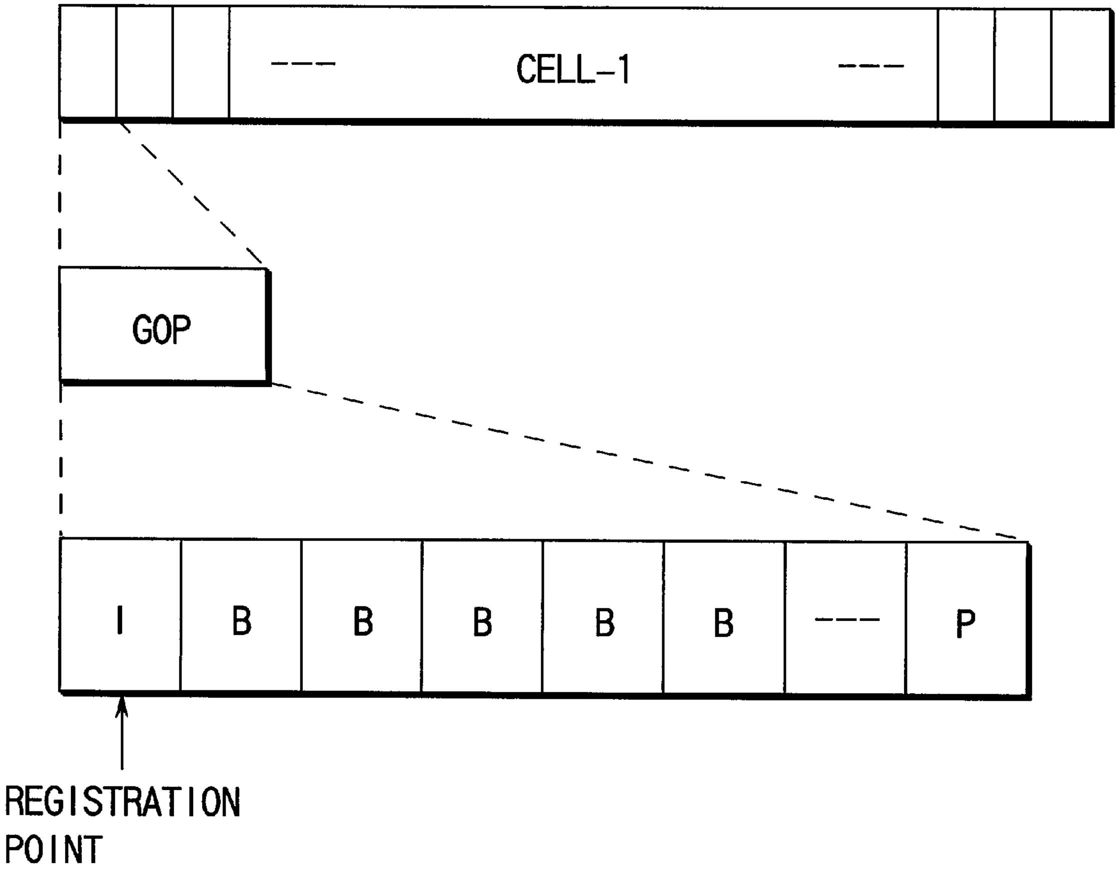
FIG. 18 is a diagram for illustrating a registering point at the time of index image registration in the pointer recording mode.

In the DVD specification, MPEG2 is used for video encoding. In the MPEG2 (also, in the MPEG1), the encoding operation is effected in a cycle called GOP as shown in FIG. 18. An intra-coding image screen (I picture) and an intercoding image screen (P picture, B picture) are contained in each GOP, but since the former is an image screen in which the coding is effected only in the image screen thereof and the latter is an image screen obtained by predicting the other image screen as a reference image screen, the latter cannot be used as an index image. Therefore, in the pointer recording mode of FIG. 17, the I picture is used as the index image and the position information thereof is set as the registration point as shown in FIG. 18.

Figure 19:
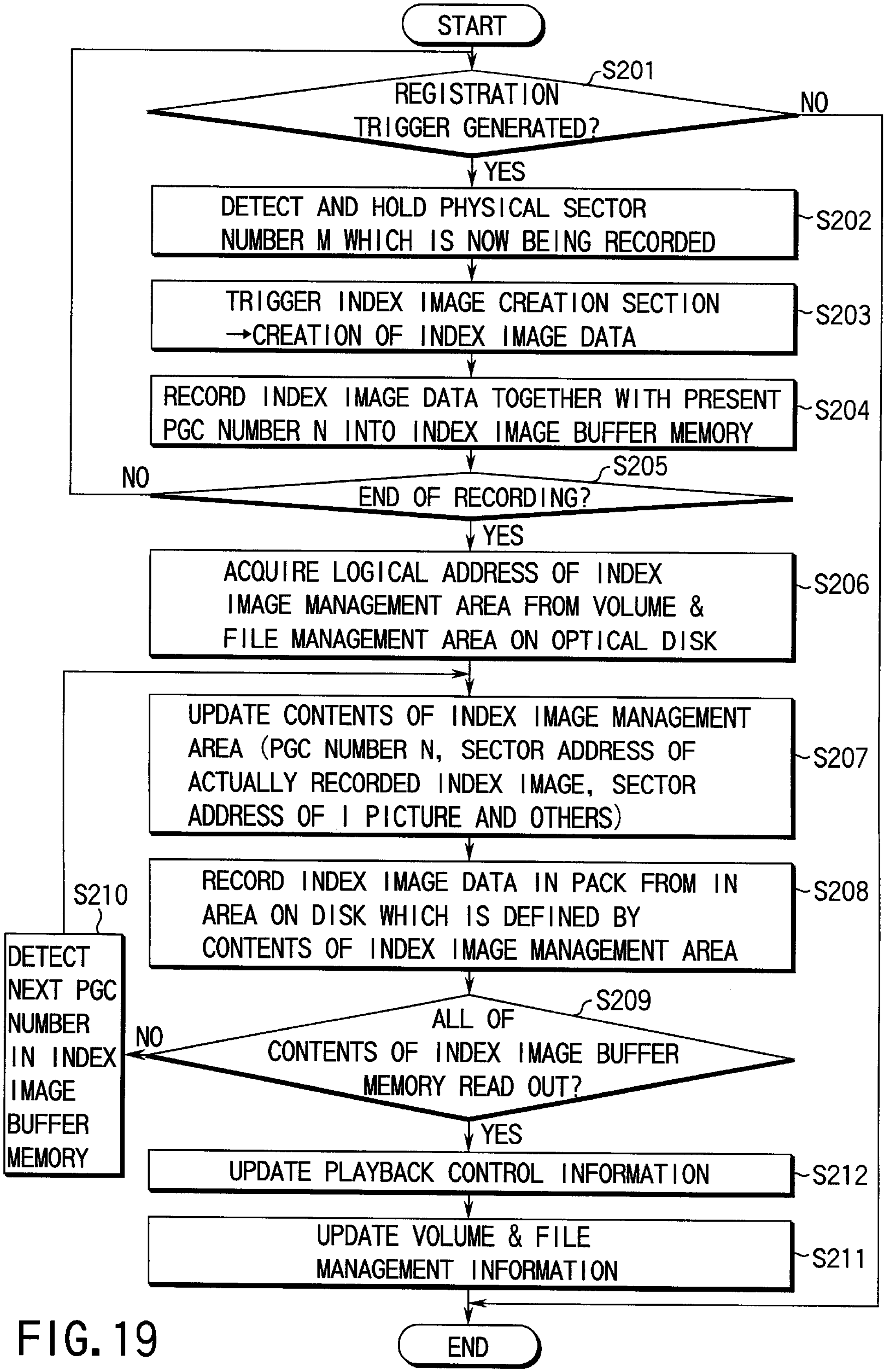
FIG. 19 is a flowchart showing the index image registering procedure in the index image recording mode in the above embodiment.

Next, the index image registration procedure by the index image recording mode is explained by use of the flowchart shown in FIG. 19.

Like the case of the pointer recording mode, if the user first supplies a registration instruction of index image via the key-in section 49, the MPU in the microcomputer block 30 determines that the registration trigger is present as shown in the step S201 and issues a registration trigger to the encoder section 50. The registration trigger from the MPU may be generated, for example, once each time the user inputs a registration instruction or the MPU may automatically generate the registration trigger at the time of recording start/termination with respect to the optical disk 10 or at the time of change of scenes of video or audio. It is preferable that the user can specify the above selection via the key-in section 49.

Next, if it is determined in the step S201 that the registration trigger is present, the MPU in the microcomputer block 30 detects the physical sector number M (head sector address of the I picture) which is now being recorded on the optical disk 10 via the disk drive 32 and data processor 36 and stores the same in the RAM (step S202) and starts the index image creating section 58 to create an I picture to be registered as the index image (step S203). Then, the index image data thus created is formed into a packet form together with the present PGC number and stored into the index image buffer memory 59.

Next, the MPU in the microcomputer block 30 determines whether the recording operation is terminated or not according to the instruction from the key-in section 49 or via the disk drive 32 and data processor 36 (step S205). If the recording operation is not terminated, the process is returned to the step S201.

If it is detected in the step S205 that the recording operation is terminated, a logical address of the picture address table shown in FIG. 20 is acquired from the volume & file management area 70 which is previously read out on the optical disk 10 (step S206). Then, the contents of the picture address, more specifically, the PGC number N, the head sector address of the index image actually recorded, the head sector address of the I picture and the like are added and updated (step S207).

Then, the MPU in the microcomputer block 30 reads out the index image data which is created by the index image creation section 58 in the step S203 and stored into the index image buffer memory 59 in the packet form and forms the readout index image data into a pack form. Then, the MPU records the index image data set into the pack form in an area (area in the picture object 84) on the optical disk 10 which is defined by the contents of the picture address table in the steps S206, S207 via the data processor 36 and disk drive 32 (step S208).

Then, whether or not all of the index image data stored in the index image buffer memory 59 is read out is determined (S209). If index image data is left behind in the index image buffer 59, the PGC number N of the next index image is specified and the process of the steps S207, S208 is repeatedly effected. If all of the index image data is read out, an image having the playback control information 102 and volume & file management area 70 recorded therein as shown in FIG. 3 is sequentially updated (steps S211, S212) and the process is terminated.

Next, the format of the user menu file on the optical disk 10 associated with the index image is explained. The user menu file is a file name of the reduced drawing control information 108 (the reduced drawing control information is hereinafter referred to as a user menu file) shown in FIG. 3. The format of the user menu file can conceptually take a construction as shown in 20 and is specifically constructed as shown in FIGS. 21 and 22.

First, as indicated from the top to the bottom in FIG. 20, data in the user menu file 108 is described in the order of a first anchor pointer, picture address table, index image data group, backup of the picture address table and second anchor pointer.

A pointer address called the first anchor pointer (a, p, b, q) is first set in the user menu file, and "a" and "p" are a start address and end address of the picture address table and "b" and "q" are a start address and end address of backup data of the picture address table.

Next to the first anchor pointer, the picture address table is recorded. Menu index information (INFO1) is recorded in the first position of the picture address table. The menu index information contains the number of index pictures, the number of information pictures, the number of defective areas and the number of wall paper picture registering sheets. Among them, the number of information pictures indicates the number of registered sheets of index images recorded in the pointer recording mode (the image is called an information picture). The number of index pictures is equal to the total sum of the number of index images recorded in the index image recording mode and the number of information pictures.

The "correlation table between PGC and index image recording position" set after the menu index information is actual data relating to each index image constructing the user menu file and the PGC number (PGCN) of the index image, PTS (the playback timing of the I picture as the index image), the head address (c) of the index image, the number of use sectors of the index image including the dummy area, the size only of the index image, the head address (pointer) of the I picture as the index image, text data used for searching and entitling, the head address and data length of a defective area if the defective area is present in the file, the number of wall paper picture registering sheets of the user menu and the head address (s) thereof and the like are recorded in this portion. The total data amount of the picture address table is aligned with 32 kbytes (32k×N bytes) as will be described later.

After the picture address table, an actual index image data group created in the index image data creation section 58 shown in FIG. 15 is recorded. Further, after the correlation table, the backup of the picture address table is recorded. The backup is recorded for insurance against breakage of the picture address table. The index image data and backup are formed in a pack form and are actually recorded in the picture object 84 shown in FIG. 3. The index image and backup are also aligned with 32 kbytes as will be described later.

In the last position of the user menu file, a second anchor pointer (a, p, b, q) which is the same as the first anchor in the head position of the user menu file is described. The reason for this arrangement is that the file is normally destroyed from the head management area to which access is frequently made. By setting the anchor pointer in the last position of the file, the safety is further enhanced.

The user menu file of FIG. 20 has the following features.

(1) At least one menu selection index image data (that is, index image data) which expresses a still image of at least part of video data is recorded in the same user menu file.

(2) All of the index image data items recorded on the optical disk 10 (DVD-RAM disk, DVD-RW disk or DVD-R disk) are collectively managed (a video signal corresponding to the recording position is specified) by use of the picture address table.

More specifically, information shown in FIGS. 21, 22, for example, is written into the user menu file of FIG. 20. That is, as shown in FIGS. 21, 22, as the first anchor pointer for the picture address table, the start position of the picture address table, the end position of the picture address table, the start position of a spare picture address table and the end position of the spare picture address table are described. AS the picture address table (corresponding to 108B of FIG. 3), menu index information (INFO1), a plurality of index picture information items (INFO2), defective area information (INFO4), wall paper picture information (INFO5) and padding data are described. As the second anchor pointer for the picture address table, the start position of the picture address table, the end position of the picture address table, the start position of the backup of the picture address table and the end position of the backup of the picture address table are described. In the picture address table shown in FIGS. 21, 22, the information picture information INFO3 shown in FIG. 3 may be adequately described.

Menu index information of FIG. 21 contains the number of index pictures, the number of information pictures, the number of defective areas and the number of wall paper pictures. Index picture information contains the contents characteristic, ID of the index picture program chain, the time code of the index picture, the start position of the index picture, the number of sectors used for recording the index picture, the picture size, and the address and searching text data of the index picture (I picture).

As the time code of the index picture, PTS of the head sector of the I picture is described. However, it is possible to describe the number of fields and the number of pictures (the number of fields×2) as the time code. Further, a picture which can be specified as the index picture is not limited to the I picture, but it is possible to specify the P picture or B picture (that is, specify the field number) to derive the I picture as will be described in another embodiment.

In the contents characteristic contained in the index picture information, "1" is described if the index image used in the user menu is already recorded and "0" is described if only the recording position (address) of the index image is recorded.

The index picture information in a case where a user menu image is specified only by use of an address contains the contents characteristic in which "0" is described as shown in FIG. 22, ID of the information picture program chain PGC, the time code in the PGC corresponding to the information picture, and an address of the PGC corresponding to the information picture.

The wall paper picture information of FIG. 22 contains the number of wall paper pictures which can be used as the wall paper picture of the user menu (the number of a registered wall paper picture), the start position of the wall paper picture, and the number of sectors used in an area in which the wall paper picture is recorded and the padding data of FIG. 22 contains the contents of the index picture, the contents of the defective area and the contents of the wall paper picture.

Next, the "32-kbyte aligning process" is explained.

The internal portion of the user menu file shown in FIGS. 20 to 22 is divided for every 32 kbytes corresponding to a unit of error correction code (ECC block) irrespective of the already recorded area and non-recorded area and the position of the "ECC boundary" which is the boundary portion thereof is previously determined.

When the index image data, anchor pointer, picture address table and backup of the picture address table are recorded, the recording start position and the recording end position of all of the data items are recorded to coincide with the "ECC boundary" positions.

If the data amount is slightly smaller than an integral number of 32 kbytes, a "dummy area" is added as shown in FIG. 20 so as to make the recording end position coincident with the "ECC boundary" position. The "dummy area" indicates the "padding" area in FIG. 21.

At the time of recording/erasing of index image data, the recording/erasing operation of information is effected for each "ECC boundary". In this case, since it is not necessary to change part of information in the ECC block, reduced data can be directly overwritten in alignment with the ECC boundary at the recording time.

If the "32-kbyte aligning process" described above is effected, the operation speed of the recording/erasing operation in the unit of ECC block can be enhanced since it becomes unnecessary to correct error correction information which is added to record/erase the index image data in the unit of ECC block.

The user menu file of FIG. 20 is designed by considering the transportation to another type of recording medium by use of a personal computer or the like. Therefore, the storage addresses of the index image, wall paper picture and picture address table of the user menu are expressed by difference addresses (relative addresses) from the head position of the user menu file.

In the "correlation table between PGC and index image recording position" in the picture address table of FIG. 20, two lines from the PGC number to the searching text data size express one set of correspondence tables. In this case, the relation between the recorded index image data and the video signal can be understood based on the correspondence relation between the time code (PTS) of the video signal and the head address. Further, by searching the whole correlation table, the non-recorded area in the user menu file or the free area obtained by erasing index image data can be detected and new index image data can be recorded in the area.

In the user menu file of FIG. 20, a defective area is managed. A specific processing method effected in a case where the picture address table is damaged by dust or scratches attached to the surface of the disk (recording medium) 10 is explained.

First, the damage of the picture address table due to the dust or scratch on the surface of the disk (recording medium) is detected (whether it is damaged or not can be determined according to whether the error correction of the ECC block fails or not).

When the damage is detected, anchor pointer information is read out, the backup data address of the picture address table is checked and the backup data of the picture address table is read out.

Next, the non-recorded area in the user menu file is searched for by use of the correlation table between the index image recording positions of FIG. 20. Then, index image management data is recorded in the non-recorded area in the user menu file and the address information of the anchor pointer is updated.

Then, the location in which the picture address table is damaged by the dust or scratch on the surface of the disk (recording medium) is registered as a defective area in the correlation table between the index image recording positions of FIG. 20.

If the user menu file format of FIGS. 20 to 22 is used, the following effect can be expected.

(a) The index image data can be added/searched and the access speed can be enhanced by effecting the "32-kbyte aligning process".

(b) When a plurality of index images are simultaneously displayed on the display section of a monitor display (not shown), it becomes necessary to access a corresponding index image data position on the recording medium for each reduced image screen. If index position data items are randomly arranged (scattered) on the recording medium, it takes a long time to access and time required for displaying the plurality of index images becomes long. However, as shown in FIG. 20, if the plurality of index manage data items are collectively arranged in the same user menu file, the plurality of index images can be displayed at high speed simply by playing back the user menu file.

(c) By collectively managing the whole index image data by use of the picture address table, the management of the process for deleting or adding the index image data becomes easier. That is, the searching operation for the non-recorded area (or the index image data deleting area) in the user menu file becomes easier and additional registration of new index image data can be effected at high speed.

(d) In the DVD video recorder shown in FIG. 15, data is collected for every 16 packs (=32 kbytes) to make an ECC block in the data processor 36 and the ECC block is recorded on the optical disk (DVD-RAM, DVD-RW or DVD-R) 10 after error correction information is attached thereto. Therefore, if part of information in the ECC block is changed, it is necessary to correct the attached error correction information, the process becomes troublesome and it takes a long time to effect the information changing process. However, by effecting the "32-kbyte aligning process", correction of the error correction information attached when the index image data is erased in the unit of ECC block is made unnecessary and the user menu data can be erased at high speed.

(e) The high reliability of the anchor pointer, picture address table and backup data of the picture address table can be securely attained by the following method.

* Secure attainment of the reliability of the picture address table

A backup area of the picture address table is provided to make ready for a case wherein the picture address table becomes defective and if the defect occurs, the recording location can be moved.

* Secure attainment of the reliability of the anchor pointer information indicating the recording location of the picture address table The anchor pointer information is independently constructed in an ECC block to suppress the data changing times and the same information is recorded in two locations (first and second anchor pointers in FIG. 20).

* Defect management process

In a case where information playback from the picture address table or anchor pointer becomes impossible due to the dust or scratch on the surface of the optical disk (recording medium), data is read out from the backup section and recorded in another recording position again. As a result, it is prevented that the defective area is registered and the defective area is erroneously used again.

A closed caption or multiplexed character is superposed on the original image in the index image data used for the user menu in some cases. In such a case, the index image may be constructed after the character is multiplexed. Further, it is considered that the index image may be constructed only by use of character data.

Figure 23:
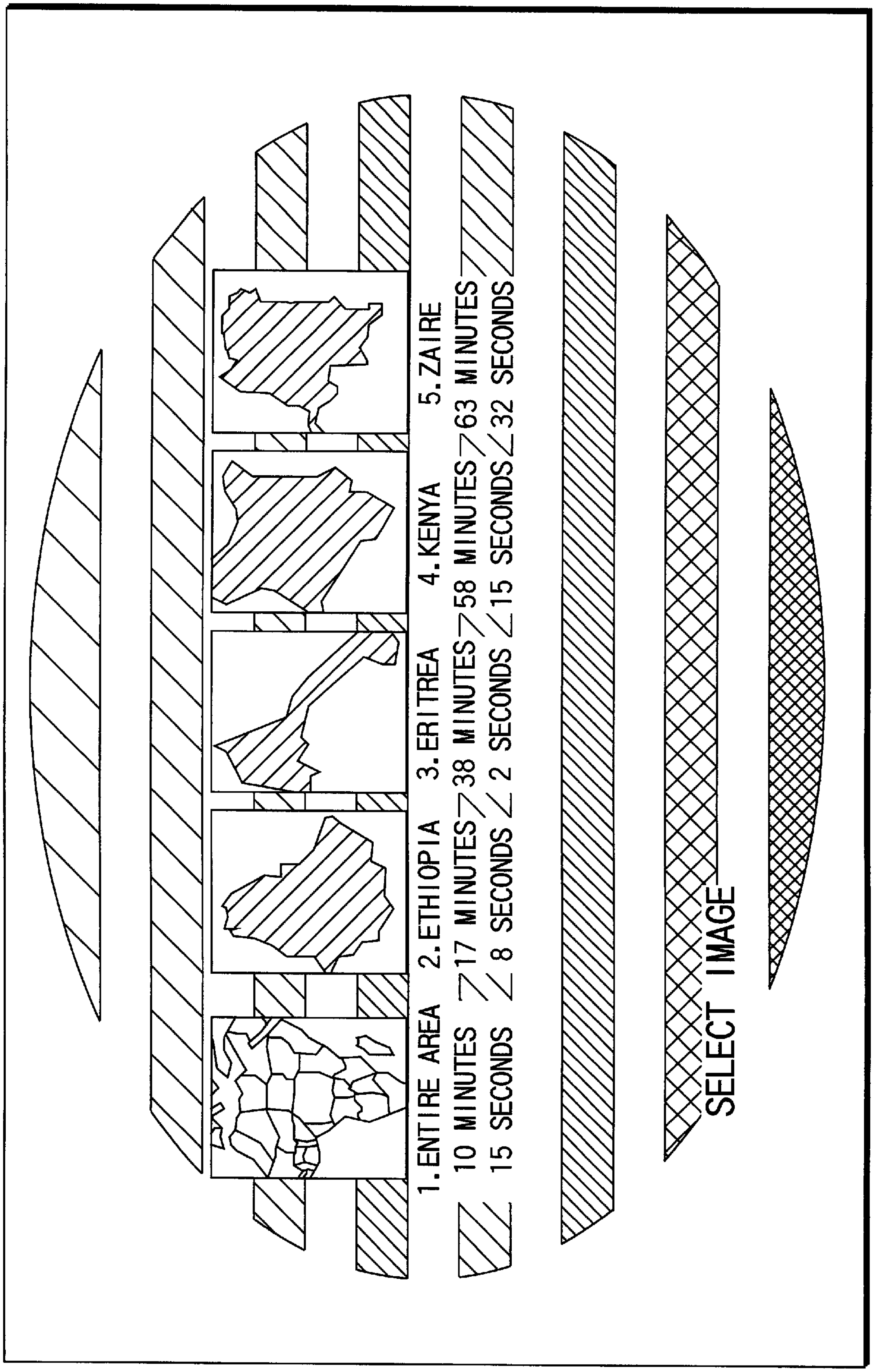
FIG. 23 is a diagram showing one example of display of the menu screen in the above embodiment.

FIG. 23 shows a concrete display example of the menu screen obtained by use of the index image registered on the optical disk 10 in this embodiment. In this example, an image of a map of the entire area of Africa as an image 1, images of maps of discrete countries as images 2, 3 are displayed in the form of a list. The menu screen is displayed by depressing a menu key in the key-in section 49. The user selects an image of a desired number in the screen so as to search for the position on the optical disk 10 on which the selected image is recorded and edit the same. Further, by displaying the time code from the head point together with the images 1, 2, . . . as shown in FIG. 23, a period of time from the playback start time in which the image is displayed can be derived from the recorded image.

Figure 24:
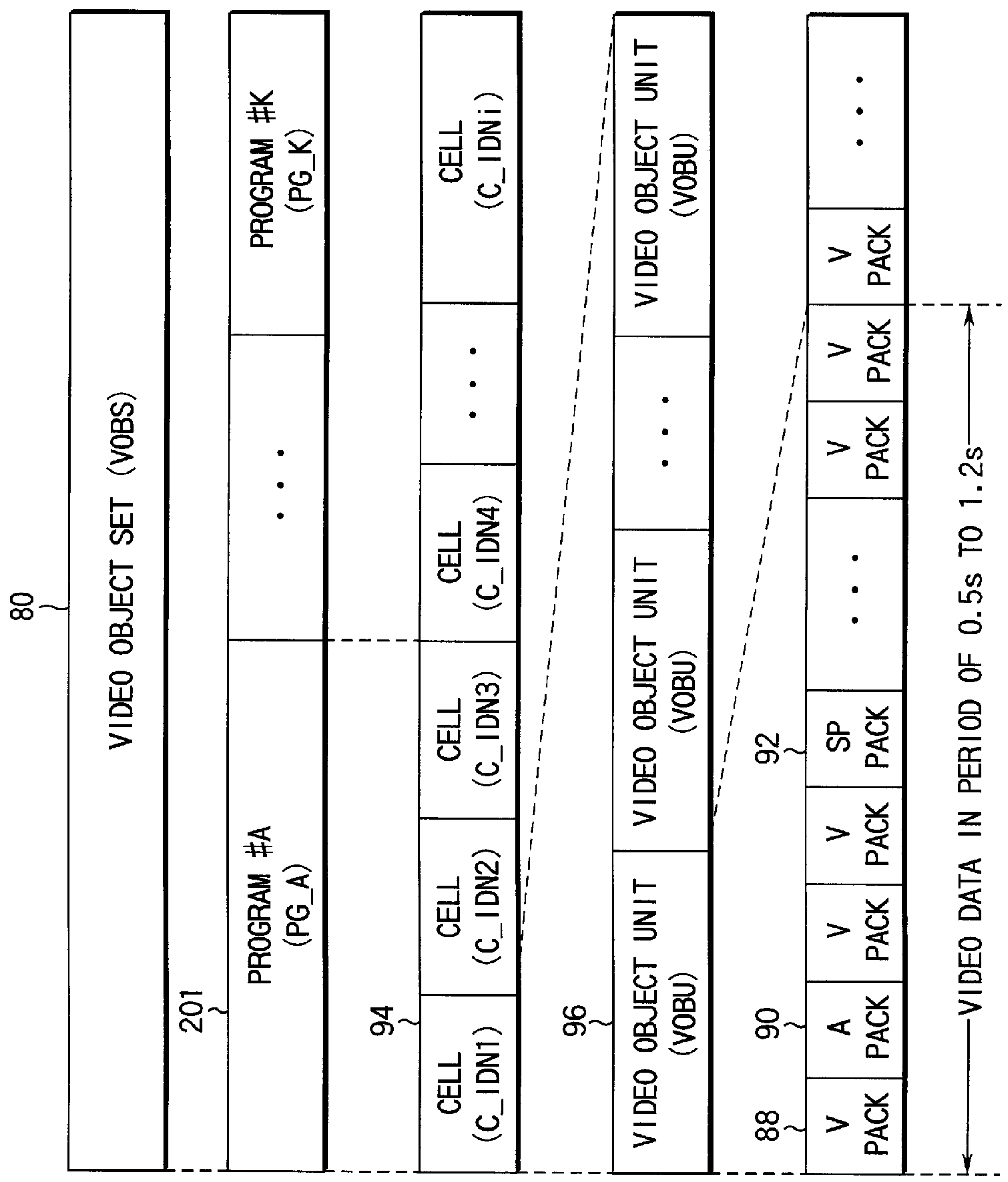
FIG. 24 is a diagram showing a data format for controlling the image in the unit of program.

Next, another embodiment of this invention is explained. In this embodiment, as shown in FIG. 24, a plurality of cells 94 are collected to construct groups of programs (PG) 201 and the playback image is controlled in the unit of program. The position of the index image is specified by the cell number in the program and the display time (the number of fields) of the index image to be registered.

Figure 25:
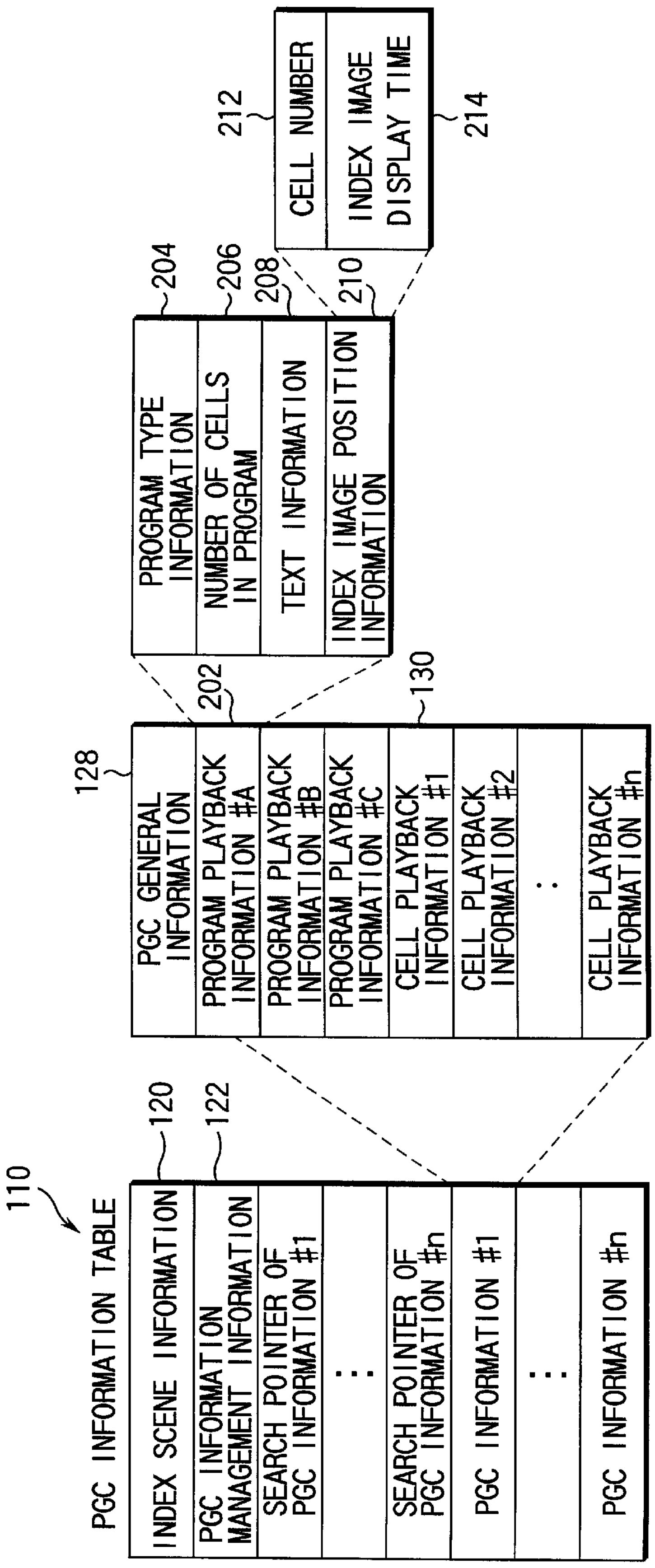
FIG. 25 is a diagram showing another construction of the PGC information management table.
Figure 26:
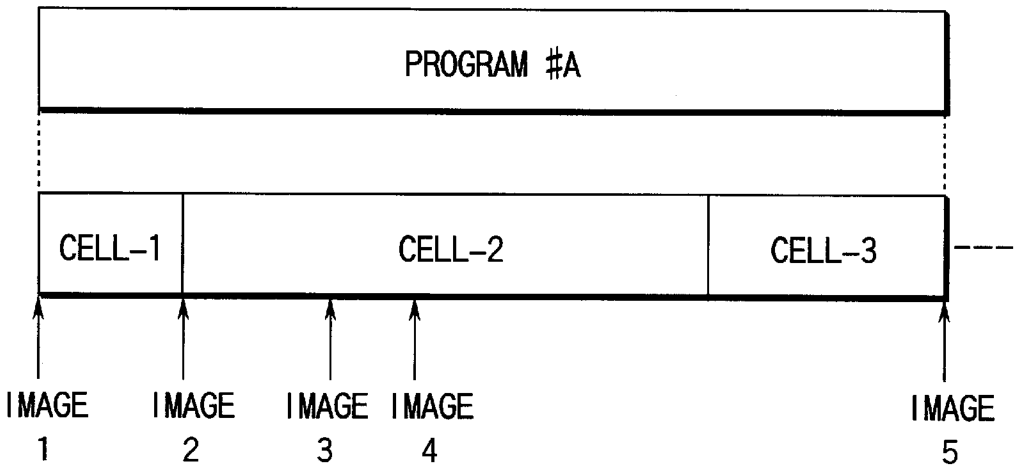
FIG. 26 is a diagram showing the construction of one program which includes a plurality of cells.

In this embodiment, as shown in FIG. 25, program playback information 202 is inserted between PGC general information 128 and cell playback information 130 in the format shown in FIG. 8. The contents of the program playback information 202 include program type information 204, the number 206 of cells contained in the program, text information 208 and index image position information 210 and the position of the index image is specified by the cell number and the display time thereof (the number of fields) as shown in FIG. 26.

Figure 27:
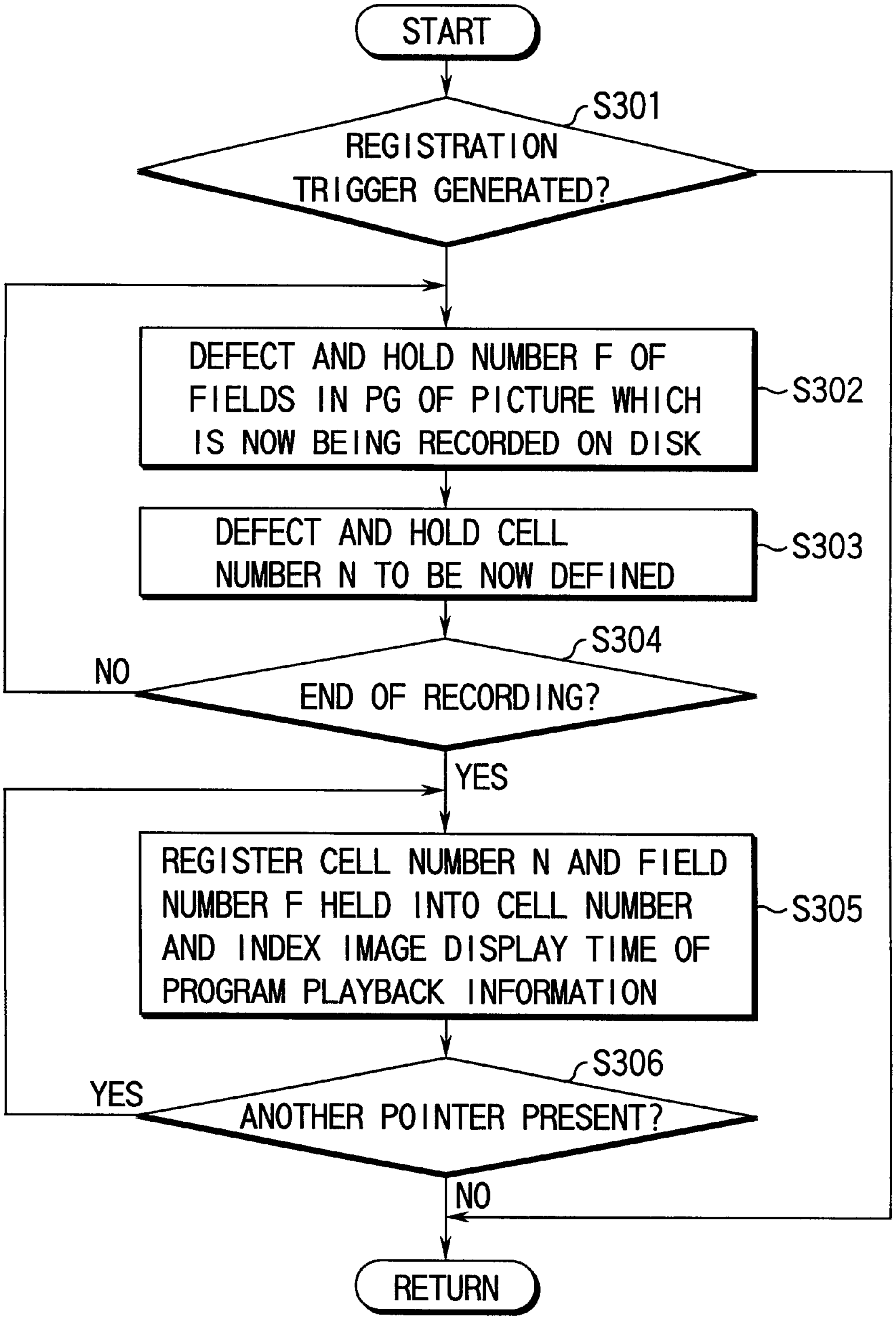
FIG. 27 is a flowchart showing the procedure for registering display time on the optical disk.

FIG. 27 is a flowchart showing the procedure for registering the display time on the optical disk. First, the MPU in the microcomputer block 30 determines whether or not the registration trigger is present as shown in the step S301. If the registration trigger is present, the MPU detects and holds the display time of the picture which is now being recorded on the optical disk 10, that is, the number F of fields in the program (PG) which is now being recorded (step S302). Then, the MPU detects and holds the cell number which is now to be defined (step S303).

Whether or not the recording operation is terminated is determined in the step S304 and if it is not terminated, the step S302 is effected again. If it is determined in the step S304 that the recording operation is terminated, the MPU in the microcomputer block 30 registers the cell number N and field number F held in the steps S303 and 302 into the cell number 212 and index image display time of the program playback information 202 of FIG. 25.

If other pointers (cell number and field number) are further held (step 306), the step S305 is effected again and all of the pointers held are registered into the index image position information 210 of the optical disk.

In the former embodiment, the index image is used to specify the head address of the I picture, but this embodiment is not limited to this case and it is possible to specify the B picture or P picture.

Figure 28:
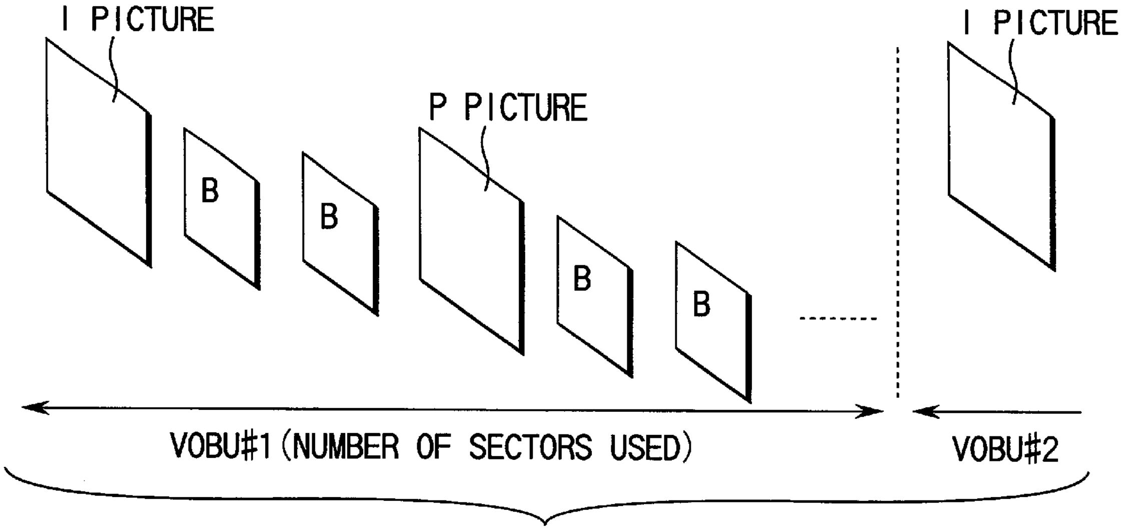
FIG. 28 is a diagram showing the relation between VOBU and field in MPEG.

FIG. 28 shows the relation between VOBU and the field in MPEG. An area from an I picture to a next I picture is collected as VOBU. The number of pictures in one second is determined to be 30 in the NTSC system. Since one picture corresponds to two fields, 60 fields are displayed in one second. In this example, an area from an I picture to a next I picture is defined as one GOP. However, one VOBU is not limited to one GOP and may include a plurality of GOPs in some cases.

Figures 29, 30:
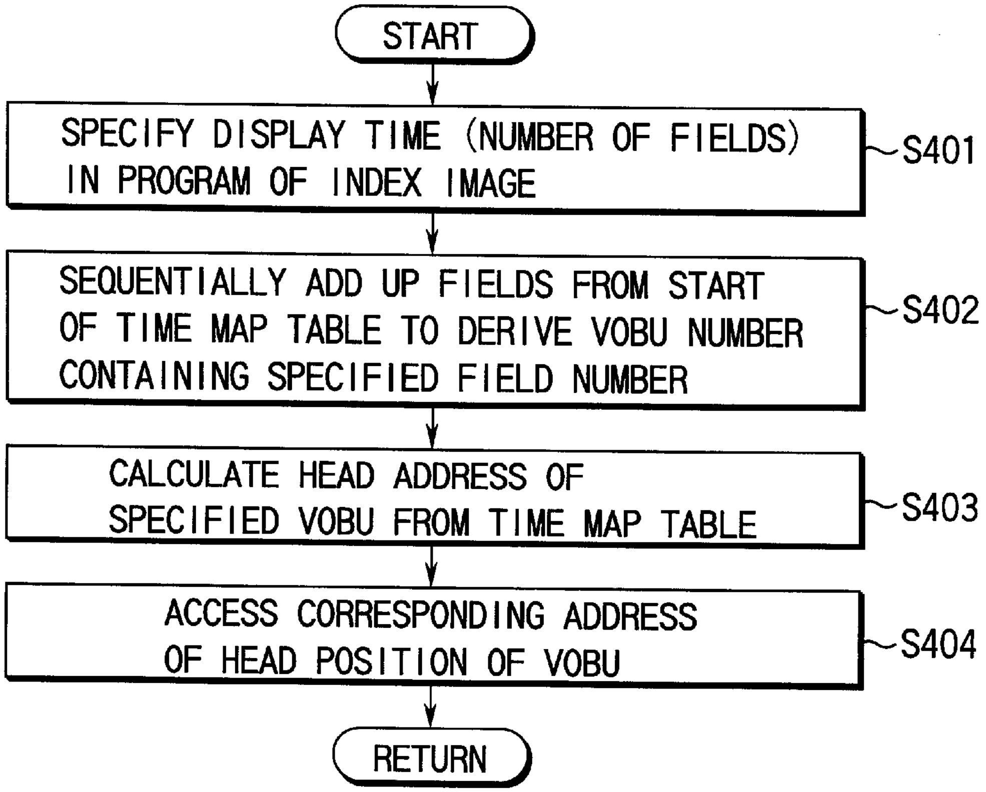
FIG. 29 is a diagram showing the construction of a time map table.
FIG. 30 is a flowchart showing the process for deriving a position in which image data is recorded from the number of fields.

A time map table 111 as shown in FIG. 29 is recorded in the playback control information 102 of FIG. 6 to indicate the relation between the display time of each picture and the recording address on the optical disk for each VOBU. If the playback time (field) of each picture is specified, the position address on the optical disk on which it is recorded can be calculated.

FIG. 30 is a flowchart showing the calculation procedure. First, the MPU in the microcomputer block 30 reads out the specified field number from the index image display time of the program playback information 202 of FIG. 25 (step S401). Then, the number of the field is sequentially added starting from the first VOBU of the time map table 111 of FIG. 29 to derive the VOBU number which contains the specified field number (step S402).

Next, the head address of VOBU which contains the specified field number is calculated from the time map table 111. As shown in FIG. 28, since data of the I picture is recorded in the head address of VOBU, the MPU in the microcomputer block 30 accesses the head address of VOBU and displays the I picture as the index image (step S404).

In the above embodiments, registration of the index image is explained, but this invention can also be similarly applied to a case wherein specified audio data is registered.

Further, this invention is not limited to the recording/playback apparatus, but can be applied to a playback apparatus, that is, playback-only apparatus having no recording function.

As described above, according to this invention, the user can instantly detect the recording information on the recording medium by recording position information (pointer) indicating the recording position of an image selected from the main record data on the recording medium or recording an image selected from the main record data as the index image, and utilizing information of an image and voice recorded in the recording position indicated by the position information or the index image as a menu at the time of playback. Therefore, the user can rapidly search for a desired position based on the menu and efficiently effect the editing operation such as the operation for erasing and replacing information in a desired area on the recording medium.

What is claimed is:

1. A recording/playback apparatus for recording and playing back main record data containing information of at least one of an image and voice by use of a recordable/playable recording medium, the recording/playback apparatus comprising:

trigger supplying means for supplying a trigger for registering an index image;

position information acquiring means for acquiring recording position information of an image which is now being recorded on said recording medium in response to a trigger supplied from said trigger supplying means, said position information acquiring means including (i) detection means for detecting the start of I picture creation, (ii) first holding means for detecting an d holding a sector number which is now being recorded on said recording medium in response to detection by said detection means, and (iii) second holding means for detecting a n d holding a cell number which is now to be defined; and position recording means for recording the recording position information acquired by said position information acquiring means on said recording medium at the time of termination of the image recording, said position recording means including means for recording the sector and cell number held by said first and second holding means in an index information recording area on said recording medium.

2. A recordable/playable recording medium on which main record data containing information of at least one of an image and voice is recorded, the recordable/playable recording medium comprising:

an index information area for recording recorded position information of an image selected from the main record data, said index information area being constructed by a plurality of files, and an amount of data in each file being an integral number of times larger than an error correction code block capacity; and an index image recording area for recording image data of an image selected from the main record data as an index image, and an amount of data in each index image being an integral number of times larger than the error correction code block capacity.

3. A recording/playback apparatus for recording and playing back main record data containing information of at least one of an image and voice by use of a recordable/playable recording medium, the recording/playback apparatus comprising:

trigger supplying means for supplying a trigger for registering a specific image recorded on the recording/playable recording medium;

position information acquiring means for acquiring recording position information recorded on the recording medium in response to a trigger supplied from said trigger supplying means, said position information acquiring means including first holding means for detecting at least cell information, which includes information indicating a starting position of the specific image which is to be now defined, as the recording position information, and then holding the cell information, the cell information being included in program chain information indicating a playback order of the specific image; and position recording means for recording the recording position information acquired by said position information acquiring means on the recording medium, said position recording means including means for recording, along with the program chain information, the cell number held by said first holding means in a specific-image position information recording area on the recording medium.

4. A recording/playback apparatus according to claim 3, wherein the specific image is one of a plurality of specific images to be registered in the trigger.

5. A recording/playback apparatus according to claim 3, wherein the specific image is one of a plurality of specific images existing in each of cells.

6. A recording/playback apparatus according to claim 3, wherein said position recording means records the program chain information on the recording medium by using a disk drive.

7. A recording/playback apparatus for recording and playing back main record data containing information of at least one of an image and voice by use of a recordable/playable recording medium, the recording/playback apparatus comprising:

trigger supplying means for supplying a trigger for registering an index image;

position information acquiring means for acquiring recording position information of an image which is now being recorded on said recording medium in response to a trigger supplied from said trigger supplying means, said position information acquiring means including (i) first holding means for detecting and holding a sector number which is now being recorded on said recording medium in response to detection by said detection means, and (ii) second holding means for detecting and holding cell information which is now to be defined; and position recording means for recording the recording position information acquired by said position information acquiring means on said recording medium at the time of termination of the image recording, said position recording means including means for recording the sector number and the cell information held by said first and second holding means in an index information recording area on said recording medium.

* * * * *